United States Patent [19]

Mathews et al.

[11] Patent Number: 5,539,409
[45] Date of Patent: Jul. 23, 1996

[54] APPARATUS AND METHOD FOR WINDSHEAR DATA PROCESSING

[75] Inventors: Bruce D. Mathews, Catonsville; Michael J. Albano, Columbia; Guy T. Railey, Columbia; Fran Miller, Baltimore, all of Md.

[73] Assignee: Westinghouse Electric Corp., Pittsburgh, Pa.

[21] Appl. No.: 269,321

[22] Filed: Jun. 30, 1994

[51] Int. Cl.⁶ .................................................. G01S 13/95
[52] U.S. Cl. ............................ 342/26; 342/196; 342/460; 342/93
[58] Field of Search ........................... 342/26, 460, 196, 342/91, 92, 93

[56] References Cited

U.S. PATENT DOCUMENTS

| | | |
|---|---|---|
| Re. 33,152 | 1/1990 | Atlas .......................................... 342/26 |
| 4,589,070 | 5/1986 | Kyrazis ..................................... 364/424 |
| 4,649,388 | 3/1987 | Atlas .......................................... 342/26 |
| 4,667,199 | 5/1987 | Roberts .................................... 342/169 |
| 4,857,922 | 8/1989 | Miller et al. ............................. 340/968 |
| 5,117,359 | 5/1992 | Eccles ....................................... 364/420 |
| 5,130,712 | 7/1992 | Rubin et al. .............................. 342/26 |
| 5,196,854 | 3/1993 | Mathews ................................... 342/26 |
| 5,262,782 | 11/1993 | Rubin et al. .............................. 342/26 |
| 5,311,183 | 5/1994 | Mathews et al. ......................... 342/26 |
| 5,315,297 | 5/1994 | Cornman .................................. 340/968 |
| 5,351,045 | 9/1994 | Cornman .................................. 340/968 |
| 5,359,330 | 10/1994 | Rubin et al. .............................. 342/26 |
| 5,361,065 | 11/1994 | Johnson et al. .......................... 340/968 |
| 5,409,379 | 4/1995 | Montag et al. ............................. 434/2 |
| 5,410,314 | 4/1995 | Frush et al. .............................. 342/26 |
| 5,428,358 | 6/1995 | Gardner .................................... 342/26 |
| 5,434,570 | 7/1995 | Wurman .................................... 342/26 |

OTHER PUBLICATIONS

James Evans, Development of an Automated Windshear Detection System Using Doppler Weather Radar, Nov. 1989, pp. 1661–1673.

*Primary Examiner*—John B. Sotomayor

[57] ABSTRACT

The present invention improves upon conventional windshear data processing techniques in three mutually exclusive aspects. First, the present invention provides an improved method and system for detecting microburst downdraft candidates. The improvement lies in its capability of detecting multiple candidates in range. Because of the added capability to detect multiple candidates in range, the present invention also provides an improved method and system for azimuthal association of the multiple candidates in range to define an accurate locus of headwind and tailwind pairs. Second, the present invention provides an improvement in that it utilizes a non-circularly symmetric spatial model to compute the vertical component of a total hazard factor. Third, the present invention provides an improvement in the accurate detection of small radii microbursts by correcting bias present in the data from which the small radii microbursts may be detected.

39 Claims, 14 Drawing Sheets

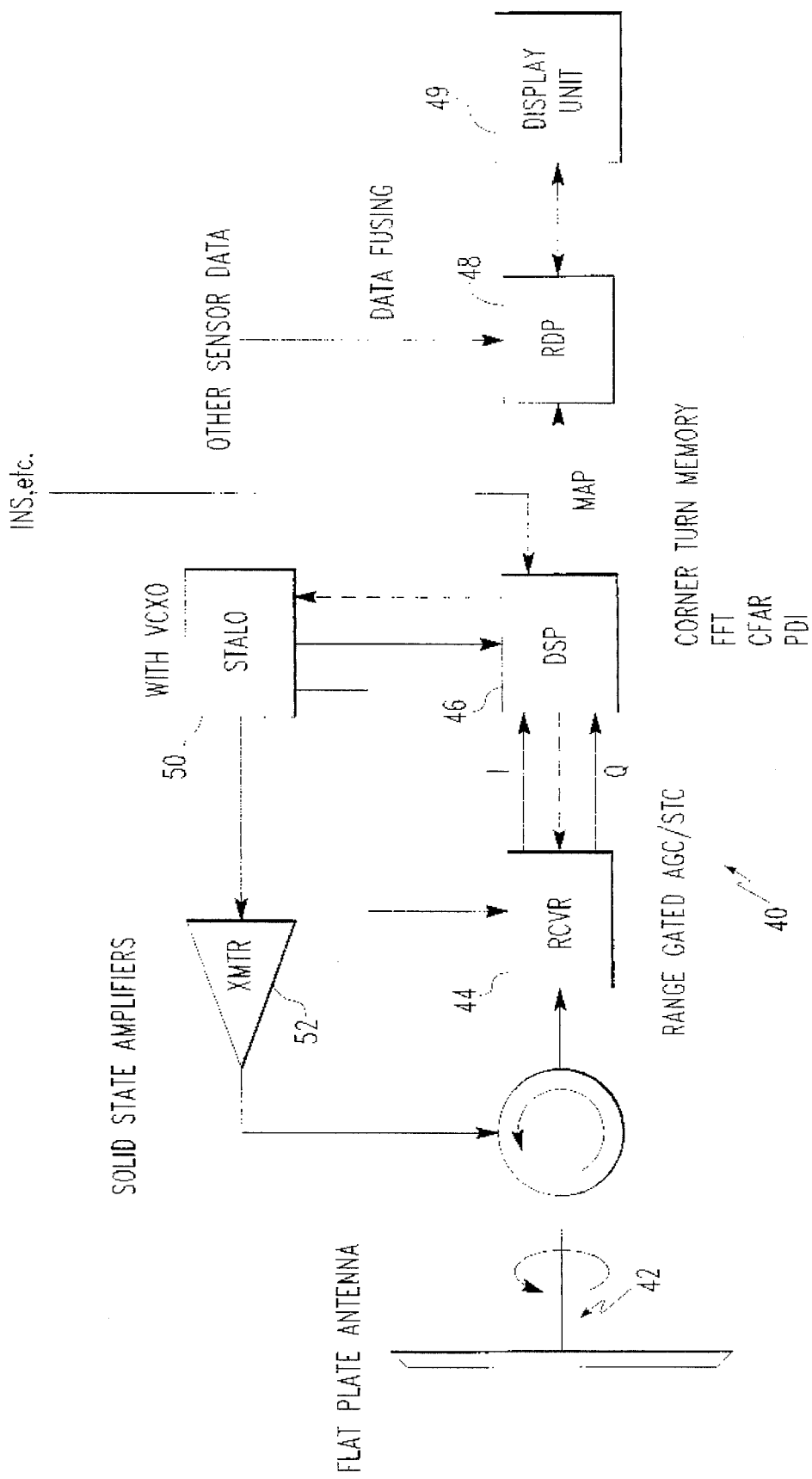

RANGE GATES 1-25

*FIG. 3A*

RANGE GATES 1-25

*FIG.3B*

RANGE GATES 1-25

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| 1 | -20 | -20 | -20 | -20 | -20 | -20 | -20 | -20 | -20 | -20 | -20 | -20 | -20 | -20 | -20 | -20 | -20 | -20 | -20 | -20 | -20 | -20 | -20 | -20 | -20 |
| 2 | -20 | -20 | -20 | -20 | -20 | -20 | -20 | -20 | -20 | -20 | -20 | -20 | -20 | -20 | -20 | -20 | -20 | -20 | -20 | -20 | -20 | -20 | -20 | -20 | -20 |
| 3 | -20 | -20 | -20 | -20 | -20 | 8 | 10 | 11 | 20 | 19 | 21 | 20 | 26 | 36 | 40 | 41 | 43 | 43 | 43 | 42 | 41 | 39 | 40 | 38 | 38 |
| 4 | -20 | -20 | 9 | -20 | -20 | 9 | 11 | 12 | 19 | 19 | 23 | 22 | 27 | 35 | 39 | 41 | 41 | 42 | 43 | 41 | 42 | 40 | 40 | 38 | 38 |
| 5 | -20 | -20 | 8 | -20 | -20 | 8 | 11 | 14 | 22 | 20 | 25 | 22 | 28 | 35 | 38 | 40 | 41 | 41 | 42 | 39 | 39 | 40 | 40 | 39 | 38 |
| 6 | -20 | -20 | 8 | -20 | -20 | 7 | 10 | 15 | 27 | 25 | 27 | 24 | 28 | 33 | 38 | 40 | 41 | 41 | 42 | 39 | 39 | 38 | 39 | 38 | 39 |
| 7 | 4 | -20 | 10 | -20 | 8 | -20 | 11 | 16 | 26 | 24 | 27 | 27 | 30 | 34 | 40 | 43 | 43 | 43 | 43 | 40 | 39 | 36 | 39 | 38 | 38 |
| 8 | 4 | 4 | 10 | -20 | 8 | -20 | 11 | 17 | 28 | 25 | 30 | 30 | 32 | 35 | 39 | 41 | 42 | 42 | 41 | 40 | 38 | 36 | 38 | 37 | 37 |
| 9 | 5 | 5 | -20 | 9 | 9 | 9 | 12 | 17 | 28 | 29 | 30 | 30 | 33 | 35 | 39 | 42 | 41 | 43 | 41 | 40 | 39 | 37 | 37 | 36 | 36 |
| 10 | 3 | 6 | -20 | 9 | 10 | 7 | 10 | 18 | 31 | 28 | 31 | 32 | 32 | 37 | 40 | 42 | 42 | 44 | 41 | 39 | 39 | 36 | 37 | 36 | 36 |
| 11 | -20 | -20 | 6 | 10 | 10 | 7 | 10 | 21 | 30 | 28 | 31 | 34 | 32 | 38 | 41 | 42 | 42 | 43 | 40 | 40 | 38 | 36 | 36 | 35 | 36 |
| 12 | -20 | -20 | -20 | 10 | 9 | 8 | 10 | 20 | 28 | 28 | 32 | 33 | 35 | 39 | 40 | 43 | 43 | 44 | 40 | 42 | 35 | 36 | 35 | 34 | 34 |
| 13 | -20 | -20 | -20 | 11 | -20 | 7 | 10 | 20 | 31 | 28 | 34 | 33 | 35 | 38 | 40 | 44 | 43 | 45 | 41 | 38 | 34 | 36 | 34 | 34 | 33 |
| 14 | -20 | -20 | -20 | 9 | -20 | 6 | 11 | 20 | 32 | 29 | 34 | 36 | 38 | 39 | 41 | 43 | 43 | 43 | 41 | 37 | 35 | 35 | 34 | 32 | 32 |
| 15 | -20 | 8 | 11 | 9 | -20 | -20 | 14 | 23 | 33 | 33 | 36 | 41 | 39 | 42 | 42 | 42 | 44 | 42 | 41 | 41 | 34 | 34 | 33 | 33 | 31 |
| 16 | -20 | -20 | -20 | -20 | -20 | -20 | 15 | 25 | 33 | 35 | 36 | 40 | 39 | 42 | 42 | 42 | 43 | 42 | 40 | 41 | 34 | 35 | 33 | 34 | 30 |
| 17 | -20 | -20 | -20 | -20 | -20 | 6 | 18 | 27 | 33 | 35 | 37 | 39 | 40 | 41 | 42 | 42 | 42 | 43 | 41 | 42 | 35 | 35 | 33 | 34 | 34 |
| 18 | -20 | -20 | 11 | -20 | -20 | 6 | 20 | 29 | 34 | 34 | 35 | 40 | 39 | 39 | 42 | 42 | 42 | 42 | 42 | 39 | 33 | 33 | 33 | 34 | 33 |
| 19 | -20 | -20 | 11 | -20 | -20 | -20 | 21 | 31 | 36 | 36 | 37 | 42 | 43 | 41 | 43 | 42 | 41 | 41 | 39 | 39 | 34 | 35 | 34 | 34 | 33 |
| 20 | -20 | -20 | -20 | -20 | -20 | -20 | 22 | 33 | 38 | 38 | 38 | 41 | 42 | 41 | 43 | 41 | 41 | 40 | 38 | 39 | 33 | 35 | 33 | 33 | 33 |
| 21 | -20 | -20 | -20 | 10 | -20 | -20 | 22 | 33 | 37 | 36 | 38 | 39 | 42 | 42 | 44 | 42 | 41 | 39 | 37 | 38 | 34 | 36 | 33 | 33 | 33 |
| 22 | -20 | -20 | -20 | 7 | -20 | -20 | 23 | 34 | 38 | 37 | 39 | 40 | 42 | 43 | 43 | 43 | 40 | 39 | 36 | 39 | 34 | 34 | 33 | 32 | 32 |
| 23 | -20 | -20 | -20 | -20 | -20 | -20 | 22 | 32 | 38 | 38 | 37 | 41 | 42 | 44 | 44 | 45 | 41 | 39 | 35 | 38 | 32 | 33 | 31 | 30 | 30 |
| 24 | -20 | -20 | -20 | -20 | -20 | -20 | 21 | 34 | 40 | 39 | 39 | 42 | 43 | 44 | 45 | 44 | 43 | 38 | 35 | 37 | 34 | 35 | 32 | 31 | 29 |
| 25 | -20 | 6 | -20 | 11 | -20 | -20 | 19 | 32 | 34 | 38 | 41 | 40 | 41 | 44 | 43 | 43 | 43 | 37 | 34 | 35 | 34 | 32 | 34 | 28 | 28 |
| 26 | -20 | 7 | -20 | 9 | -20 | -20 | 18 | 31 | 35 | 36 | 40 | 40 | 45 | 43 | 43 | 43 | 39 | 37 | 35 | 34 | 31 | 35 | 29 | 27 | |
| 27 | -20 | 7 | -20 | 10 | -20 | -20 | 16 | 30 | 35 | 37 | 39 | 41 | 41 | 45 | 45 | 44 | 43 | 42 | 41 | 33 | 34 | 31 | 33 | 29 | 29 |
| 28 | 7 | 8 | -20 | 10 | -20 | -20 | 13 | 28 | 34 | 35 | 38 | 41 | 40 | 44 | 44 | 45 | 41 | 45 | 43 | 34 | 34 | 32 | 33 | 29 | 30 |
| 29 | 8 | 8 | 9 | 10 | -20 | -20 | 11 | 27 | 34 | 35 | 38 | 41 | 39 | 42 | 41 | 44 | 41 | 45 | 40 | 36 | 36 | 32 | 35 | 32 | 29 |
| 30 | 11 | 8 | 13 | 10 | -20 | -20 | 9 | 23 | 31 | 34 | 37 | 38 | 37 | 41 | 41 | 44 | 41 | 44 | 40 | 37 | 36 | 33 | 34 | 34 | 31 |
| 31 | 11 | 7 | 15 | 9 | 5 | 5 | -20 | 21 | 31 | 34 | 36 | 39 | 38 | 43 | 44 | 45 | 43 | 44 | 41 | 37 | 36 | 34 | 35 | 35 | 32 |
| 32 | 13 | 7 | 17 | 10 | -20 | -20 | -20 | 21 | 31 | 35 | 36 | 41 | 41 | 44 | 44 | 46 | 42 | 45 | 41 | 38 | 35 | 35 | 33 | 36 | 31 |
| 33 | 13 | 7 | 15 | 10 | -20 | -20 | -20 | 22 | 31 | 35 | 37 | 38 | 40 | 41 | 42 | 44 | 41 | 43 | 41 | 42 | 35 | 35 | 33 | 36 | 31 |
| 34 | 13 | 7 | 15 | 12 | 6 | -20 | -20 | 21 | 32 | 34 | 36 | 36 | 43 | 41 | 42 | 43 | 41 | 41 | 39 | 38 | 36 | 36 | 38 | 37 | 34 |
| 35 | 13 | 6 | 17 | 11 | -20 | -20 | -20 | 20 | 31 | 36 | 36 | 37 | 42 | 44 | 44 | 45 | 42 | 40 | 39 | 37 | 36 | 35 | 35 | 36 | 34 |
| 36 | 12 | 5 | 14 | 10 | -20 | -20 | -20 | 18 | 32 | 37 | 37 | 40 | 41 | 44 | 44 | 46 | 43 | 42 | 40 | 37 | 35 | 35 | 33 | 35 | 32 |
| 37 | 12 | 6 | 14 | 11 | 6 | -20 | -20 | 18 | 30 | 37 | 38 | 40 | 41 | 43 | 44 | 45 | 43 | 43 | 40 | 36 | 36 | 34 | 33 | 32 | 31 |
| 38 | 12 | 7 | 12 | 10 | 8 | 6 | 6 | 15 | 29 | 38 | 36 | 38 | 39 | 41 | 43 | 43 | 44 | 42 | 41 | 37 | 38 | 33 | 32 | 31 | 29 |
| 39 | 11 | 8 | 12 | 10 | 7 | 6 | 6 | 14 | 28 | 36 | 36 | 39 | 38 | 41 | 42 | 42 | 43 | 41 | 42 | 38 | 38 | 33 | 31 | 31 | 28 |
| 40 | 11 | 9 | 13 | 10 | 8 | 6 | 6 | 13 | 27 | 37 | 34 | 40 | 39 | 42 | 42 | 42 | 42 | 42 | 41 | 39 | 37 | 33 | 30 | 30 | 25 |
| 41 | 9 | 8 | 12 | 10 | 10 | 9 | 6 | 11 | 27 | 36 | 35 | 40 | 40 | 40 | 42 | 39 | 40 | 41 | 40 | 39 | 38 | 33 | 30 | 27 | 24 |
| 42 | 9 | 8 | 12 | 10 | 10 | 9 | 7 | 9 | 25 | 34 | 34 | 38 | 41 | 41 | 41 | 39 | 40 | 41 | 40 | 38 | 37 | 33 | 30 | 26 | 23 |
| 43 | 9 | 7 | 12 | 10 | 11 | 10 | 8 | 8 | 24 | 34 | 32 | 39 | 43 | 42 | 42 | 42 | 40 | 40 | 40 | 39 | 36 | 34 | 31 | 27 | 20 |
| 44 | 10 | 6 | 12 | 10 | 10 | 10 | 8 | 7 | 21 | 31 | 31 | 42 | 41 | 41 | 42 | 40 | 41 | 38 | 37 | 37 | 35 | 32 | 29 | 26 | 15 |
| 45 | 12 | 7 | 12 | 10 | 10 | 11 | 9 | 8 | 19 | 29 | 31 | 41 | 40 | 41 | 41 | 41 | 41 | 38 | 36 | 36 | 35 | 33 | 30 | 25 | 13 |
| 46 | 12 | 6 | 12 | 10 | 10 | 11 | 10 | 10 | 16 | 32 | 35 | 41 | 42 | 43 | 42 | 44 | 41 | 39 | 38 | 37 | 37 | 34 | 32 | 23 | 15 |
| 47 | 10 | 6 | 13 | 9 | 9 | 10 | 9 | 10 | 15 | 31 | 34 | 41 | 40 | 44 | 43 | 43 | 41 | 39 | 38 | 35 | 35 | 33 | 31 | 23 | 12 |
| 48 | 10 | 6 | 12 | 9 | 8 | 7 | 9 | 8 | 14 | 30 | 33 | 40 | 40 | 43 | 43 | 44 | 41 | 39 | 38 | 34 | 34 | 34 | 29 | 24 | 14 |
| 49 | 8 | 5 | 11 | 9 | 8 | 7 | 10 | 9 | 15 | 31 | 33 | 39 | 42 | 42 | 43 | 43 | 42 | 41 | 38 | 34 | 34 | 34 | 28 | 25 | 17 |
| 50 | 8 | 5 | 12 | 12 | 8 | 8 | 9 | 8 | 16 | 30 | 33 | 39 | 42 | 42 | 43 | 44 | 43 | 42 | 38 | 37 | 33 | 33 | 29 | 26 | 22 |
| 51 | 7 | 6 | 11 | 11 | 9 | 7 | 10 | 8 | 15 | 29 | 31 | 40 | 42 | 43 | 44 | 44 | 42 | 43 | 38 | 36 | 34 | 30 | 29 | 28 | 26 |
| 52 | 7 | 6 | 10 | 10 | 7 | 10 | 12 | 9 | 14 | 28 | 30 | 39 | 40 | 41 | 44 | 43 | 43 | 43 | 37 | 36 | 35 | 31 | 30 | 29 | 27 |

*FIG. 4A*

RANGE GATES 1-25

| | | | | | | | | | | | | | | | | | | | | | | | | | |
|---|---|---|---|---|---|---|---|---|---|---|---|---|---|---|---|---|---|---|---|---|---|---|---|---|---|
| 53 | 7 | 6 | 11 | 11 | 7 | 9 | 12 | 9 | 14 | 26 | 29 | 37 | 41 | 40 | 43 | 42 | 44 | 42 | 38 | 36 | 33 | 30 | 30 | 29 | 28 |
| 54 | 7 | 7 | 11 | 11 | 8 | 10 | 12 | 10 | 14 | 26 | 30 | 39 | 43 | 42 | 42 | 42 | 44 | 41 | 37 | 34 | 32 | 30 | 31 | 30 | 29 |
| 55 | 9 | 7 | 12 | 11 | 7 | 9 | 11 | 9 | 14 | 25 | 30 | 41 | 43 | 42 | 42 | 42 | 41 | 41 | 37 | 34 | 31 | 29 | 31 | 30 | 31 |
| 56 | 6 | 7 | 10 | 8 | 7 | 8 | 11 | 9 | 14 | 26 | 31 | 41 | 38 | 41 | 40 | 41 | 40 | 40 | 37 | 34 | 32 | 30 | 32 | 31 | 33 |
| 57 | 8 | 6 | 11 | 7 | 7 | 7 | 9 | 8 | 15 | 26 | 32 | 38 | 37 | 40 | 40 | 41 | 41 | 40 | 38 | 35 | 34 | 31 | 32 | 32 | 33 |
| 58 | 8 | 6 | 11 | 8 | 8 | 6 | 9 | 7 | 15 | 26 | 33 | 40 | 37 | 40 | 40 | 41 | 41 | 40 | 39 | 36 | 34 | 30 | 32 | 31 | 33 |
| 59 | 8 | 7 | 11 | 8 | 9 | 5 | 9 | 9 | 13 | 28 | 34 | 39 | 38 | 41 | 39 | 40 | 40 | 39 | 39 | 36 | 35 | 33 | 33 | 32 | 34 |
| 60 | 8 | 7 | 13 | 8 | 10 | 5 | 9 | 10 | 13 | 28 | 35 | 38 | 39 | 40 | 39 | 40 | 39 | 39 | 39 | 37 | 35 | 36 | 32 | 33 | 35 |
| 61 | 8 | 8 | 13 | 9 | 9 | 7 | 9 | 10 | 14 | 28 | 35 | 38 | 39 | 39 | 39 | 40 | 40 | 37 | 38 | 37 | 34 | 37 | 32 | 32 | 33 |
| 62 | 9 | 10 | 14 | 12 | 9 | 9 | 10 | 11 | 12 | 26 | 35 | 40 | 39 | 40 | 40 | 40 | 40 | 36 | 38 | 37 | 33 | 34 | 31 | 32 | 31 |
| 63 | 10 | 10 | 14 | 12 | 10 | 9 | 8 | 11 | 11 | 25 | 35 | 41 | 39 | 39 | 40 | 40 | 39 | 36 | 39 | 36 | 33 | 34 | 32 | 31 | 32 |
| 64 | 11 | 12 | 16 | 15 | 10 | 9 | 8 | 11 | 8 | -21 | 34 | 40 | 39 | 41 | 40 | 41 | 39 | 35 | 39 | 36 | 35 | 36 | 33 | 30 | 28 |
| 65 | 11 | 13 | 14 | 15 | 10 | 11 | 9 | 9 | 8 | 20 | 35 | 39 | 38 | 42 | 40 | 41 | 39 | 36 | 38 | 36 | 34 | 34 | 28 | 25 | 26 |
| 66 | 11 | 13 | 14 | 14 | 11 | 10 | 9 | 9 | 8 | 20 | 33 | 41 | 37 | 41 | 39 | 40 | 38 | 36 | 37 | 37 | 35 | 35 | 27 | 22 | 24 |
| 67 | 11 | 12 | 14 | 13 | 9 | 9 | 9 | 10 | 6 | 18 | 33 | 45 | 38 | 41 | 39 | 39 | 38 | 36 | 36 | 34 | 33 | 34 | 27 | 23 | 23 |
| 68 | 11 | 12 | 14 | 13 | 8 | 7 | 8 | 7 | 6 | 18 | 33 | 43 | 39 | 41 | 39 | 39 | 37 | 37 | 38 | 35 | 34 | 34 | 26 | 18 | 20 |
| 69 | 12 | 11 | 14 | 13 | 6 | 7 | 7 | 7 | 5 | 16 | 34 | 41 | 39 | 40 | 39 | 39 | 36 | 36 | 38 | 36 | 34 | 35 | 26 | 17 | 18 |
| 70 | 9 | 9 | 12 | 10 | -20 | 5 | 6 | 4 | 4 | 14 | 33 | 37 | 36 | 37 | 38 | 37 | 35 | 36 | 37 | 36 | 33 | 32 | 24 | 15 | 18 |
| 71 | 9 | 8 | 12 | 9 | 8 | 5 | 7 | -20 | -20 | 14 | 32 | 39 | 37 | 39 | 39 | 38 | 36 | 37 | 36 | 39 | 34 | 31 | 22 | 14 | 14 |
| 72 | 9 | 6 | 10 | 9 | 7 | 5 | -20 | -20 | -20 | 12 | 32 | 41 | 40 | 40 | 42 | 38 | 35 | 36 | 36 | 37 | 33 | 28 | 20 | 11 | 11 |
| 73 | -20 | 6 | 11 | 9 | -20 | 4 | -20 | -20 | -20 | 9 | 31 | 38 | 40 | 40 | 42 | 38 | 34 | 36 | 36 | 36 | 34 | 27 | 17 | 10 | 9 |
| 74 | -20 | 6 | -20 | -20 | -20 | 4 | -20 | -20 | -20 | 7 | 30 | 38 | 40 | 42 | 40 | 40 | 34 | 35 | 34 | 34 | 32 | 25 | 18 | 7 | -20 |
| 75 | -20 | 5 | -20 | -20 | -20 | -20 | -20 | -20 | -20 | 27 | 39 | 41 | 42 | 42 | 41 | 35 | 35 | 34 | 31 | 29 | 23 | 16 | 7 | -20 | |
| 76 | -20 | -20 | -20 | -20 | -20 | -20 | -20 | -20 | -20 | 26 | 38 | 41 | 41 | 44 | 41 | 36 | 34 | 32 | 28 | 27 | 24 | 16 | 7 | -20 | |
| 77 | -20 | -20 | -20 | -20 | -20 | 3 | -20 | -20 | -20 | 25 | 36 | 39 | 41 | 42 | 39 | 35 | 34 | 32 | 25 | 25 | 24 | 16 | 8 | -20 | |
| 78 | -20 | -20 | -20 | -20 | -20 | -20 | -20 | -20 | -20 | 25 | 35 | 39 | 40 | 40 | 40 | 37 | 35 | 32 | 23 | 22 | 20 | 14 | 8 | -20 | |
| 79 | -20 | -20 | -20 | -20 | -20 | -20 | -20 | -20 | -20 | 21 | 36 | 41 | 40 | 40 | 41 | 39 | 36 | 31 | 20 | 17 | 15 | 15 | 9 | -20 | |
| 80 | -20 | -20 | -20 | -20 | -20 | -20 | -20 | -20 | -20 | 21 | 32 | 39 | 40 | 39 | 40 | 38 | 37 | 32 | 17 | 14 | 13 | 13 | 8 | -20 | |
| 81 | -20 | -20 | -20 | -20 | -20 | -20 | -20 | -20 | -20 | 21 | 30 | 37 | 40 | 39 | 39 | 38 | 36 | 31 | 19 | 14 | 13 | 13 | 9 | -20 | |
| 82 | -20 | 7 | -20 | 13 | -20 | -20 | -20 | -20 | -20 | 16 | 30 | 35 | 42 | 42 | 43 | 41 | 39 | 31 | 18 | 14 | 10 | 10 | 8 | -20 | |
| 83 | -20 | 8 | -20 | 10 | -20 | -20 | -20 | -20 | -20 | 16 | 28 | 32 | 42 | 41 | 44 | 41 | 40 | 33 | 19 | 15 | 10 | 9 | 8 | -20 | |
| 84 | -20 | 8 | -20 | 9 | -20 | -20 | -20 | -20 | -20 | 12 | 27 | 29 | 42 | 41 | 43 | 40 | 38 | 33 | 19 | 15 | 11 | 10 | -20 | -20 | |
| 85 | -20 | -20 | -20 | -20 | -20 | -20 | -20 | -20 | -20 | 11 | 25 | 28 | 41 | 40 | 43 | 41 | 39 | 30 | 18 | 17 | 8 | 6 | -20 | -20 | |
| 86 | -20 | -20 | -20 | -20 | -20 | -20 | -20 | -20 | -20 | -20 | 23 | 28 | 40 | 39 | 40 | 41 | 39 | 32 | 23 | 19 | 7 | 6 | -20 | -20 | |
| 87 | -20 | -20 | -20 | -20 | -20 | -20 | -20 | -20 | -20 | -20 | 21 | 26 | 40 | 40 | 40 | 41 | 39 | 32 | 24 | 18 | 8 | 6 | -20 | -20 | |
| 88 | -20 | -20 | -20 | -20 | -20 | -20 | -20 | -20 | -20 | 4 | 18 | 27 | 39 | 40 | 39 | 40 | 37 | 32 | 27 | 19 | 6 | 5 | -20 | -20 | |
| 89 | 8 | -20 | -20 | -20 | -20 | -20 | -20 | -20 | -20 | -20 | 14 | 27 | 40 | 40 | 40 | 42 | 39 | 35 | 32 | 21 | 7 | 6 | -20 | -20 | |
| 90 | 8 | -20 | -20 | -20 | -20 | -20 | -20 | -20 | -20 | -20 | -20 | 26 | 41 | 41 | 41 | 43 | 39 | 36 | 33 | 20 | -20 | 7 | 7 | -20 | |
| 91 | -20 | 8 | 11 | 10 | -20 | -20 | -20 | -20 | -20 | -20 | -20 | 25 | 40 | 42 | 41 | 43 | 40 | 36 | 31 | 22 | -20 | 7 | 7 | -20 | |
| 92 | -20 | -20 | 7 | -20 | -20 | -20 | -20 | -20 | -20 | -20 | -20 | 24 | 38 | 42 | 40 | 44 | 40 | 33 | 30 | 23 | -20 | 7 | 8 | 6 | |
| 93 | 5 | -20 | 8 | -20 | -20 | -20 | -20 | -20 | -20 | -20 | -20 | 23 | 39 | 43 | 41 | 45 | 40 | 36 | 33 | 22 | -20 | 6 | -20 | 6 | |
| 94 | 11 | 8 | 13 | 10 | -20 | -20 | -20 | -20 | -20 | -20 | -20 | 18 | 38 | 43 | 43 | 45 | 42 | 37 | 29 | 22 | -20 | -20 | -20 | 6 | |
| 95 | 11 | 8 | 14 | 9 | -20 | -20 | -20 | -20 | -20 | -20 | -20 | 14 | 37 | 41 | 42 | 43 | 40 | 37 | 29 | 20 | -20 | -20 | -20 | -20 | |
| 96 | 13 | 7 | 16 | 10 | -20 | -20 | -20 | -20 | -20 | -20 | -20 | 13 | 38 | 41 | 41 | 40 | 40 | 36 | 30 | 19 | -20 | 6 | -20 | -20 | |
| 97 | 13 | 6 | 16 | 9 | -20 | -20 | -20 | -20 | -20 | -20 | 2 | 8 | 35 | 41 | 38 | 39 | 39 | 35 | 29 | 16 | -20 | -20 | -20 | -20 | |
| 98 | 16 | 8 | 16 | 11 | -20 | -20 | -20 | -20 | -20 | -20 | -20 | 34 | 42 | 38 | 43 | 40 | 37 | 25 | 16 | -20 | -20 | -20 | -20 | | |
| 99 | 8 | 8 | 10 | 8 | -20 | -20 | -20 | -20 | -20 | -20 | -20 | 32 | 39 | 36 | 43 | 38 | 33 | 22 | 14 | -20 | -20 | -20 | -20 | | |
| 100 | -20 | 7 | -20 | 6 | -20 | -20 | -20 | -1 | -20 | -20 | -20 | -20 | 26 | 33 | 31 | 35 | 32 | 29 | 13 | 8 | -20 | -20 | -20 | -20 | |
| 101 | -20 | -20 | -20 | -20 | -20 | -20 | -20 | -20 | -20 | -20 | -20 | -20 | 20 | 29 | 26 | 31 | 29 | 26 | -20 | -20 | -20 | -20 | -20 | | |
| 102 | -20 | -20 | -20 | -20 | -20 | -20 | -20 | -20 | -20 | -20 | -20 | -20 | 10 | 24 | 24 | 25 | 26 | 19 | -20 | -20 | -20 | -20 | -20 | | |
| 103 | 6 | -20 | -20 | -20 | -20 | -20 | -20 | -20 | -20 | -20 | -20 | -20 | 14 | 25 | 26 | 27 | 29 | 17 | 9 | -20 | -20 | -20 | -20 | | |

*FIG. 4B*

TABLE 1

FIRST RANGE DOMAIN, Az slice 3

| PRG | PVEL | PDELV | PABSDELV | CRG | CVEL | NRG | NVEL | NDELV | NABSDELV | HEAD VEL | HdRGATE | TAILVEL | TIRGATE |
|---|---|---|---|---|---|---|---|---|---|---|---|---|---|
| (2) | 999 | 999 | 999 | 3 | 999 | 4 | 999 | 999 | 999 | (-36.0) | (2) | (+36.0) | (2) |
| 3 | 999 | 999 | 999 | 4 | 999 | 5 | 999 | 999 | 999 | (-36.0) | (2) | (+36.0) | (2) |
| 4 | 999 | 999 | 999 | 5 | 999 | 6 | 2.7 | 999 | 999 | (-36.0) | (2) | (+36.0) | (2) |
| 5 | 999 | 999 | 999 | 6 | 2.7 | 7 | 2.40 | -0.3 | +0.3 | +2.7 | 6 | (+36.0) | (2) |
| 6 | 2.7 | -0.3 | +0.3 | 7 | 2.40 | 8 | 2.42 | +0.02 | +0.02 | +2.7 | 6 | +2.40 | 7 |
| 7 | 2.40 | +0.02 | +0.02 | 8 | 2.42 | 9 | 4.1 | +1.7 | +1.7 | +2.7 | 6 | +2.40 | 7 |
| 8 | 2.42 | +1.7 | +1.7 | 9 | 4.1 | 10 | 3.4 | -0.7 | +0.7 | +2.7 | 6 | +2.40 | 7 |
| 9 | 4.1 | -0.7 | +0.7 | 10 | 3.4 | 11 | 2.1 | -1.3 | +1.3 | +2.7 | 6 | +2.40 | 7 |
| 10 | 3.4 | -1.3 | +0.3 | 11 | 2.1 | 12 | 4.1 | +2.0 | +2.0 | +2.7 | 6 | +2.40 | 7 |
| 11 | 2.1 | +2.0 | +2.0 | 12 | 4.1 | 13 | 4.4 | +0.3 | +0.3 | +2.7 | 6 | +2.40 | 7 |

FIG. 5

TABLE 2
SECOND RANGE DOMAIN, Az slice 3

| PRG | PVEL | PDELV | PABSDELV | CRG | CVEL | NRG | NVEL | NDELV | NABSDELV | HEAD VEL | HdRGATE | TAILVEL | TIRGATE | HdSET | TISET | MARKER |
|---|---|---|---|---|---|---|---|---|---|---|---|---|---|---|---|---|
| 9 | 4.1 | -0.7 | 0.7 | 10 | 3.4 | 11 | 2.1 | -1.3 | 1.3 | 3.4 | 10 | (+36.0) | (2) | 1 | 0 | 0 |
| 10 | 3.4 | -1.3 | 1.3 | 11 | 2.1 | 12 | 4.1 | +2.0 | 2.0 | 3.4 | 10 | (+36.0) | (2) | 1 | 0 | 0 |
| 11 | 2.1 | +2.0 | 2.0 | 12 | 4.1 | 13 | 4.4 | +0.3 | 0.3 | 4.1 | 12 | (+36.0) | (2) | 1 | 0 | 2 |
| 12 | 4.1 | +0.3 | 0.3 | 13 | 4.4 | 14 | 4.0 | -0.4 | 0.4 | 4.4 | 13 | (+36.0) | (2) | 1 | 0 | 3 |
| 13 | 4.4 | -0.4 | 0.4 | 14 | 4.0 | 15 | 3.7 | -0.3 | 0.3 | 4.4 | 13 | 4.0 | 14 | 0 | 1 | 14 |
| 14 | 4.0 | -0.3 | 0.3 | 15 | 3.7 | 16 | 1.6 | -1.9 | 1.9 | 4.4 | 13 | 3.7 | 15 | 0 | 1 | 15 |
| 15 | 3.7 | -1.9 | 1.9 | 16 | 1.6 | 17 | 1.2 | -0.6 | 0.6 | 4.4 | 13 | 1.8 | 16 | 0 | 1 | 16 |
| 16 | 1.8 | -0.6 | 0.6 | 17 | 1.2 | 18 | 1.4 | +0.2 | 0.2 | 4.4 | 13 | 1.2 | 17 | 0 | 1 | 17 |
| 17 | 1.2 | +0.2 | 0.2 | 18 | 1.4 | 19 | 0.5 | -0.9 | 0.9 | 4.4 | 13 | 1.2 | 17 | 0 | 1 | 17 |
| 18 | 1.4 | -0.9 | 0.9 | 19 | 0.5 | 20 | 0.4 | -0.1 | 0.1 | 4.4 | 13 | 0.5 | 19 | 0 | 1 | 19 |
| 19 | 0.5 | -0.1 | 0.1 | 20 | 0.4 | 21 | 1.2 | +0.8 | 0.6 | 4.4 | 13 | 0.4 | 20 | 0 | 1 | 20 |
| 20 | 0.4 | +0.8 | 0.8 | 21 | 1.2 | 22 | 1.3 | +0.1 | 0.1 | 4.4 | 13 | 0.4 | 20 | 0 | 1 | 20 |
| 21 | 1.2 | +0.1 | 0.1 | 22 | 1.3 | 23 | -0.6 | -1.9 | 1.9 | 4.4 | 13 | 0.4 | 20 | 0 | 1 | 20 |
| 22 | 1.3 | -1.9 | 1.9 | 23 | -0.6 | 24 | 0.1 | +0.7 | 0.7 | 4.4 | 13 | 0.4 | 20 | 0 | 1 | 20 |

FIG. 6

APPARATUS AND METHOD FOR WINDSHEAR DATA PROCESSING

BACKGROUND OF THE INVENTION

1. Field of the Invention

The present invention relates to windshear data processing. More particularly, the invention relates to formation of a single or multiple microburst downdraft candidates and calculation of horizontal outflow velocities for microburst downdrafts.

2. Description of the Related Art

A microburst is a meteorological phenomenon of atmospheric instability that causes a windshear, which is hazardous to aircraft, especially at low altitudes, for example, during final approach and initial take-off. The instability is created by warm air at lower altitudes supporting cooler, dense air at higher altitudes. When the cooler air mass exceeds a variable threshold, warm air can no longer support the cold air, and the cold air begins to penetrate and descend, often accelerating further due to evaporative cooling. A microburst derives its name from the column of cold air that descends and spreads out in all directions upon impacting with the ground. Such spreading is governed by fluid dynamics and the laws of conservation of mass. Behaving almost as an incompressible fluid, the columnar downdraft to the ground is transformed into radial outflow along the ground, producing an upside-down mushroom-like effect.

For aircraft at low altitudes, these windshear outflows are hazardous because they create a region where the local wind changes from a headwind to a tailwind. Aerodynamically, this is a performance decreasing windshear and will cause an aircraft to lose altitude. The hazard is exacerbated by the downdraft and the initial impression of the performance enhancing headwind. The severity of the hazard is balanced by the aircraft's ability to initiate and sustain altitude performance, that is, its thrust-to-weight ratio. The severity presented to an aircraft by a microburst is determined by the "total hazard factor," which is comprised of two physical contributions, namely, a horizontal term relating to the spatial rate of wind change (i.e., headwinds changing to tailwinds) and a vertical term due to downdraft.

Conventionally, a double elevation or bar radar scan transmitted from the ground has been used to detect hazardous weather. When a microburst is detected, the pilot is alerted before physical contact with the microburst by the personnel monitoring the ground based radar. Using such a double bar scan, relatively large vertical fan beams overlap and produce an upper beam Doppler spectrum and a lower beam Doppler spectrum, subtracted to allow the velocity bound of the difference Doppler spectrum to provide wind speed components at heights near the surface.

This ground based approach, however, is not particularly applicable to airborne systems having scans looking downward, because airborne radar typically employs higher frequencies, maximal directive gain, and minimal antenna sidelobes. Such a double overlapping beam scan is described in U.S. Pat. No. RE 33,152. Airborne turbulence mapping systems typically involve pulse pair processing approaches, in which autocorrelation is used between the echoes, as typified by U.S. Pat. No. 4,835,536. Alternatively, the turbulence can be characterized by a variance of velocities over a range, without respect to a performance decreasing structure, as described in U.S. Pat. No. 4,223,309. Neither of the latter two approaches, however, is suitable for a downlooking system for detecting windshear.

A system has been described that aids pilots in avoiding windshear hazards and that also minimizes false windshear alarms. This system is described in U.S. patent application Ser. No. 07/714,133, filed Jun. 13, 1991, and assigned to the Assignee of the present invention, for which a Notice of Allowability issued on Oct. 6, 1992. This system employs a two-elevation bar scan to produce horizontal wind maps at differing altitudes. The upper bar scan indicates the presence of a Doppler structure for microbursts at antenna pointing angles that minimize the illumination of vehicular targets moving along the ground. Using the microburst downdraft candidates identified by the upper bar scan, a total windshear hazard factor can be constructed and/or detected. If, however, no microburst downdraft candidates are identified by the upper bar scan, no total hazard factor detection and/or construction will occur.

Using this system, microburst downdraft candidates are recognized by an expansive and continuous velocity ordered structure existing with angular continuity, establishing a candidate by the consistency of velocity ordering over an angle swath. For successive azimuth angle lines-of-site, the range of peak headwind (e.g., the least negative Doppler) must either consistently lie at greater or lesser ranges than the range of peak tailwind (e.g., the least positive Doppler). This system defined runs of velocity ordering by how many M of the last N order angle reports were of the initiating, dominant ordering (M less than or equal to N). A run will furnish a candidate record when the number of same ordered angle reports exceeds a certain threshold level. When a run fails the continuation criteria, a new run is begun where the prior run of angle reports stops. When the number of reporting angles is large enough, a candidate record is written which includes the range and azimuth angle to peak headwind and peak tailwind for each line-of-site of the azimuth angle run.

This system for candidate formation employing an "adaptive M of N type continuity algorithm" is not highly accurate, however, in determining microburst downdraft candidate angle location. Moreover, this system suffers from an inability to efficiently form candidates from small strings of angular data reports (i.e., early detection of approaching microburst downdrafts). Finally, this system is capable of determining at most a single candidate for any one line-of-sight of the radar. This is because this system only searches for global maximum and minimum Doppler velocities along each angular line-of-sight scan by the radar. Thus, this system lacks the capacity to identify and form multiple candidates in range.

The two bar radar scan system described in U.S. patent application Ser. No. 07/714,133 (cited above) also furnishes information about the change in horizontal outflow velocity of a microburst downdraft as a function of altitude above the ground. In that system, the horizontal outflow of velocity at either elevation scan bar for a sensed microburst candidate region was calculated by assuming a circularly-symmetric outflow in space. Given the centered location in range and angular coordinates of a downdraft candidate, the peak head and tailwinds along any radar line-of-site within the candidate outflow velocity locus could be compensated for the Doppler projection of the viewing geometry. In addition, an estimate for the average horizontal outflow over the outflow circumference could be formed by calculating the incrementally summed flux (i.e., radial velocity multiplied by the incremental circumference) at each point along the locus normalized by the circumference of the assumed circle. The radius of the assumed circle was established by an amplitude weighted mean and ratio standard deviation of the amplitude data reported within the candidate locus. Once the horizontal outflow velocity (i.e., the horizontal term of the total hazard factor) was calculated, the vertical downdraft term could be deduced, in general, from the mass continuity principle.

Assuming the velocity outflow is circularly symmetric, an algorithm assuming circular symmetry is limited in accuracy only by random processes. If the velocity outflow is non-circularly symmetric, however, an algorithm assuming circular symmetry is additionally inaccurate, because the projection of the winds along the radar line-of-site are compensated using a circular outflow locus. Using such a circularly symmetric model, therefore, errors will arise in the presence of asymmetric outflows, analogous to the errors that arise in using orthogonal functions. That is, a linear function modeling a quadratic function can approximate much of the quadratic data, but it is fundamentally incapable of achieving high accuracy.

Although most microbursts are circularly symmetric, asymmetric microbursts will result from a non-normal impact. That is, a microburst downdraft in the presence of a strong prevailing/steering wind will not descend vertically, but will have slightly non-perpendicular impact with the ground, which will produce some spatial and velocity asymmetry. Furthermore, multiple clustered microbursts, a.k.a. "lines," can occur, which can also produce some spatial and velocity asymmetry. A model assuming circular symmetry on non-circularly symmetric data, however, will cause errors. Thus, a higher order, non-circularly symmetric model will limit the inaccuracies arising from a circularly symmetric model.

Conventional systems, including the system described in U.S. patent application Ser. No. 07/714,133, frequently fail to account for the presence of microbursts having a relatively small radius and outflow. As a result, the total hazard factor will be underestimated, because calculation of total hazard factor does not reflect these small radii events.

Accordingly, a need exists for a system for achieving more accurate microburst downdraft candidate angle location and expanse with superior abilities to efficiently and quickly detect approaching microburst downdraft candidates and for identifying multiple candidates in range. Moreover, a need exists for a system for determining the horizontal term, and calculating therefrom the vertical term, of a total hazard factor resulting from a microburst downdraft candidate having asymmetric qualities and for accurately detecting small radii microbursts.

SUMMARY OF THE INVENTION

Accordingly, the present invention is directed to an apparatus and method for calculating a vertical component of a total hazard factor of multiple microburst downdraft candidates in range from a determined horizontal component, including accounting for small microbursts, and for more accurately identifying such candidates, substantially obviating one or more of the problems due to limitations and disadvantages of the related art.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof, as well as the appended drawings.

To achieve these and other advantages and in accordance with the purpose of the invention, as embodied and broadly described herein, the invention is a radar system for calculating a vertical component of a total hazard factor of a microburst downdraft, comprising: means for scanning the atmosphere at an upper altitude and identifying the microburst downdraft; means for deriving spatial parameters of a non-circularly symmetric velocity model of the identified microburst downdraft; means for determining an upper horizontal outflow velocity of the identified microburst downdraft using the non-circularly symmetric velocity model; means for scanning the atmosphere at a lower altitude; means for modifying the spatial parameters of the non-circularly symmetric velocity model to correspond to the shape of the identified microburst downdraft at the lower altitude; means for determining a lower horizontal outflow velocity of the identified microburst downdraft using the modified non-circularly symmetric velocity model; and means for computing the vertical component of the total hazard factor from the upper horizontal outflow velocity, the lower horizontal outflow velocity, and the spatial parameters of the non-circularly symmetric velocity model.

In another aspect, the present invention is a radar system for calculating a horizontal outflow velocity of a microburst downdraft, comprising: means for identifying the microburst downdraft; means for deriving an elliptical spatial model of the identified microburst downdraft, wherein the boundary of the elliptical spatial model is defined by two separated halves of a circle coupled to each other by two substantially parallel and substantially straight lines; and means for calculating the horizontal outflow velocity from the elliptical spatial model.

In yet another aspect, the present invention is a radar system for forming a microburst downdraft candidate, comprising: means for incrementally scanning the atmosphere in an angular swath having a plurality of angle report points; means for determining, at each of the plurality of angle report points, a peak headwind and a peak tailwind, each having a range from the radar system and a velocity; means for detecting a start point of the microburst candidate; means for detecting a stop point of the microburst candidate by comparing the range and velocity of the peak headwind and peak tailwind determined at a final incremental angle report point with the range and velocity determined at a previous incremental angle report point immediately preceding the final incremental report point; and means for designating the width of the microburst candidate as the distance from the start point to the previous incremental angle report point.

In yet another aspect, the present invention is a radar system for forming a data string record representing a plurality of microburst candidates in range and determining whether each of the plurality of microburst candidates is a valid candidate, comprising: antenna scanning means for incrementally scanning the atmosphere in a plurality of angle slices; means for identifying a plurality of headwinds or tailwinds or headwinds and tailwinds in one of the plurality of angle slices; means for writing in the data string record a reference range and a reference velocity for each of said headwind and/or tailwind; means for updating the data string record for each of the plurality of angle slices; means for terminating the data string record; and means for determining whether any of the plurality of microburst candidates represented by the data string record is a valid candidate.

In a further aspect, the present invention is a radar system for detecting small outflow radii microbursts, comprising: means for incrementally scanning the atmosphere in an angular swath having a plurality of angle report points; means for determining, at each of the plurality of angle report points, radial gradient of wind velocity; means for determining a horizontal hazard factor map of wind velocities; means for estimating bias errors in the determined horizontal hazard factor map; means for correcting bias errors in the determined horizontal hazard factor map; and means for identifying small radii microbursts based upon a horizontal hazard factor as provided in the corrected horizontal hazard factor map.

It is to be understood that both the foregoing and general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and, together with the description, serve to explain the objects, advantages, and principles of the invention. In the drawings.

FIG. 2 is a block diagram illustrating a radar system that may be used carry out the embodiments of the present invention;

FIG. 3 is an example of a velocity map obtained using the radar system illustrated in FIG. 2;

FIG. 4 is an example of an amplitude map corresponding to the velocity map shown in FIG. 3;

FIG. 5 is a table showing the register entries for a first range domain corresponding to azimuthal slice 3 of the velocity map shown in FIG. 3;

FIG. 6 is a table showing the register entries for a second range domain corresponding to azimuthal slice 3 of the velocity map shown in FIG. 3;

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

Figure 1:
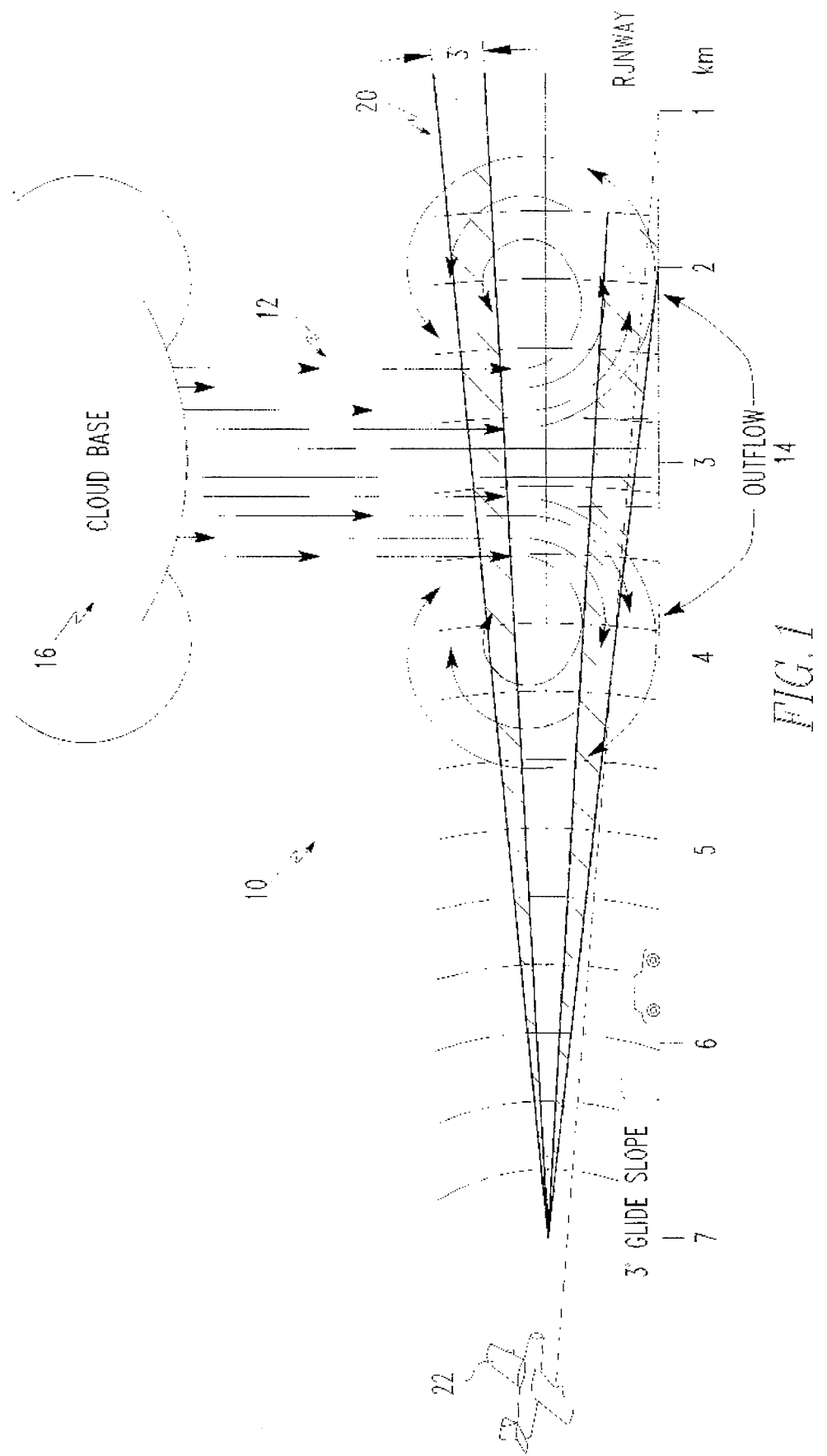
FIG. 1 is a pictorial representation of a microburst.

As shown in FIG. 1, a microburst 10 can be characterized by several features, namely, the size of the downdraft core 12, the downflow velocity within the core, the radius of the peak radial velocity, the magnitude and direction of the peak outflow velocity at various spatial locations, and the height of the vortex ring. The reflectivity of the rain falling from the cloud base 16 is used to detect the microburst core 12, while the outflow 14 is detected from the Doppler effect caused by the radial motion of the rain in the outflow 14. From the core diameter, the depth of the outflow (i.e., the point at which outflow begins) can be obtained, and, from the obtained depth of the outflow, the height and outflow velocity of the peak radial velocity of the microburst 10 can also be obtained. The system of the present invention uses an upper elevation radar scan 20 to determine the diameter of the core 12 and thus the depth of the outflow. The system can be either a ground based radar system, or an airborne radar system, such as would be present in an airplane 22. Throughout the remainder of this description of the invention, the described system of the present invention is an airborne type system, such as would be on board the airplane 22.

From the determined depth of the outflow, the height and radius of the peak radial velocity is determined to profile the microburst 10. The area covered by the peak radial velocity centered on the core 12 is used to select velocity candidates in a lower elevation scan 24 for hazard detection processing. The upper elevation scan 20 essentially provides a spatial filter that selects radar returns from range cells in the lower scan 24 that are likely to present a windshear hazard. The system of the present invention incrementally scans the atmosphere in an angular swath generating a plurality of angle report points used to form a pattern of changing wind velocities characteristic of a windshear, precluding areas otherwise having only false alert potential, rather than actual windshear hazard. When such a pattern is detected, the hazard to the aircraft 22 caused by the windshear is determined and compared to a threshold level. If the threshold level is exceeded, the pilot of the aircraft 22 is alerted in sufficient time to maneuver and avoid physical contact with the windshear.

A general description of the overall windshear detecting radar system with upper and lower elevation radar scans, as illustrated in FIG. 1, can be obtained from U.S. patent application Ser. No. 07/714,133, filed Jun. 13, 1991, and assigned to the Assignee of the present invention. That application was allowed on Oct. 6, 1992 and is incorporated herein by reference.

An exemplary embodiment of a radar system incorporating the apparatus of the present invention is shown in FIG. 2 and is designated generally by reference numeral 40. As embodied and shown in FIG. 2, the radar system incorporating the present invention includes an antenna 42, a receiver 44 having an analog-to-digital ("A/D") converter, a digital signal processor 46, a radar data processor 48, a display unit 49, a stabilized local oscillator 50, and a transmitter 52. The radar system is used to scan the atmosphere at one or more altitude levels, generating signals which are processed by the receiver 44, the digital signal processor 46, and the radar data processor 48. In this way, microburst downdraft candidates are identified so that a total hazard factor can be calculated. The details of this radar system are described in U.S. patent application Ser. No. 07/714,133, incorporated herein by reference.

The radar system 40 of the present invention is used to determine a vertical component of a total hazard factor of a microburst downdraft. The radar system scans the atmosphere and upper altitude using the antenna 42. In this way, the system 40 identifies a microburst downdraft.

In general, the estimation of vertical winds relies on the conservation of mass principle; i.e., velocity non-symmetry due to non-vertical impact of the downdraft does not distort the estimation of horizontal velocity flux. Systematic errors will arise from Doppler projection compensation, which requires an assumption of the outflow locus so that outflow orientation will include outflow components not sensed by the Doppler sensors.

The present invention improves upon the conventional techniques in three mutually exclusive aspects. First, the present invention provides an improved method and system for detecting microburst downdraft candidates. The improvement lies in its capability of detecting multiple candidates in range. Because of the added capability to detect multiple candidates in range, the present invention also provides an improved method and system for azimuthal association of the multiple candidates in range to define an accurate locus of headwind and tailwind pairs.

Second, the present invention provides an improvement in that it utilizes a non-circularly symmetric spatial model to compute the vertical component of a total hazard factor.

Third, the present invention provides an improvement in the accurate detection of small radii microbursts by correcting bias present in the data from which the small radii microbursts may be detected.

It will be apparent to those skilled in the art that the improvements described generally above, and in detail below, may be implemented separately or in combinations. However, as will be clear from the following description, it is preferred that the embodiments described herein are implemented in combination to provide a much improved system for detecting windshear hazard.

Reference will now be made in detail to the present preferred embodiments of the invention, examples of which are illustrated in the accompanying drawings.

In accordance with the first embodiment of the present invention, an apparatus and method are provided for forming a microburst downdraft candidate. The apparatus comprises means for incrementally scanning the atmosphere in an angular swath, means for determining a peak headwind and a peak tailwind, means for detecting a start point, means for detecting a stop point, and means for designating the width of a microburst candidate.

As embodied herein, the first embodiment of the present invention provides improved microburst downdraft candidate processing and formation by conditioning the criteria for continuing incrementally scanning the atmosphere and for restarting an incremental scan after a previous scan has been completed. The first embodiment excludes non-hazard windshear and altitude line (i.e., near-normal backscatter at short ranges) returns through antenna sidelobes.

In the system described in U.S. patent application Ser. No. 07/714,133 (incorporated herein by reference), the antenna 42 incrementally sweeps the atmosphere in azimuth about the nose of the aircraft 22 at a constant rate and in a number of azimuthal angle slices. The sweeping is performed in an upper bar altitude, from which downdraft core and outflow features are derived, and in a lower bar altitude, from which outflow and windshear hazard features are derived. Accordingly, the radar system uses the upper bar sweep to form microburst downdraft candidates. In performing the upper bar sweep, the system gathers data at each angle slice representing the range from the radar system to a headwind and tailwind of a microburst downdraft candidate and the Doppler velocity of the headwind and tailwind. Range is determined by examining a number of range gates for each angle slice to determine the presence of a headwind or tailwind, i.e., a Doppler velocity, each range gate representing a distance along the radar line-of-sight from the radar system.

Potential microbursts are defined by continuous runs in the sense of the ordering of the outflow range features. This means that each angle slice is classified as follows: (1) "normal," (+1), where the range to peak tailwind is greater than the range to peak headwind, i.e., outflux; (2) "inverted," (−1), where the range to the peak tailwind is less than the range to the peak headwind, i.e., influx; and (3) "indeterminant," (0), where for various reasons no report existed for tailwind and headwind ranges, for example, the presence of only noise in all range gates may produce zero Doppler reports. A "run" is defined as a sequence of angle slices across the radar beam width in which identical or compatible classifications exist.

For example, consider the following data: (A) +1 +1 +1 +1 0 −1 0 +1 −1 −1 +1 0 0; and (B) +1 −1 0 +1 −1 +1 0 0 0. Case A suggests that the first 4 or 5 beam directions have at least the sense of the outflows relating to each other. The ninth and tenth angle slice may furnish a candidate because the series of positives are followed by a series of negatives, but the others appear to be noise. Case B appears to be entirely noise. Case A can be said to begin at the first angle slice (+1) and terminate at five (−1), because the termination condition for a run is a change in sign. Termination of a run means that a microburst candidate has been located. This does not necessarily mean, however, that the candidate is valid, thus indicating the presence of a microburst having hazardous windshear.

In accordance with the first embodiment of the present invention, the system of the present invention also incrementally sweeps the atmosphere, gathering at each angle slice data representing the range and Doppler velocity of a headwind and tailwind of a candidate. The first such angle slice presents an initial angle report of the ranges and Doppler velocities of the headwind and tailwind, to which the angle report of the next angle slice is compared. The headwind and/or tailwind ranges and Doppler velocities at the next angle slice must lie within a range and Doppler bound of the initial angle report, or the system will reject the data as a valid continuation of the run and continue in its incremental sweep to the next incremental angle slice. The system will continue in this way unless a termination condition occurs, which may not happen if a change in sign does not occur.

If and when a run terminates, a new azimuthal search (and run) for consistent velocity ordering is initiated at the incremental angle slice just beyond the report trend of the previous run. That is, a new search is initiated at the angle slice immediately succeeding the last angle slice of the previous run at which the velocity ordering was the same as the preceding angle slice in that run. Thus, for example, if a run produced: +1 +1 +1 +1 +1 0 0 0 −1; termination would occur at the ninth angle slice (change in sign). For this example run, the velocity ordering is the same for the first five slices. Accordingly, the next search would commence at the sixth angle slice, (0), because the fifth angle slice of the example run represents the last angle slice of that preceding run at which velocity ordering was the same as the previous (fourth) angle slice in that run.

Therefore, the first embodiment of the present invention searches for microburst downdraft candidates, in the process backtracking over angle slice reports rejected by former candidates in angle. In addition, the first embodiment produces searches in which a terminating (qualifying) candidate has an endpoint not corrupted by angle reports having mismatching ordering which prompted the termination. Such mismatched order reports are given the additional opportunity to initiate microburst downdraft candidates and so to improve the start angle measurement of candidates. The net effect is an algorithm having capability to efficiently and accurately identify microburst candidates and to form candidates from runs covering few angle slices (i.e., early detection of approaching microbursts).

In accordance with a further aspect of the first embodiment of the present invention, an apparatus and method are provided for forming a data string record representing a plurality of microburst candidates in range and determining whether each of the microburst candidates is a valid candidate. The apparatus comprises antenna scanning means for incrementally scanning the atmosphere, means for identifying a plurality of wind pairs, means for writing headwinds and tailwinds in the data string record, means for updating the data string record, and means for terminating the data string record, and means for determining whether any of the candidates is a valid candidate.

As embodied herein, the first embodiment of the present invention provides an apparatus and method for locating multiple headwind-tailwind structures for each azimuth angle slice, thereby increasing the complexity in azimuthal association. Rather than one or no headwind-tailwind wind pairs being determined for a radar line-of-sight in an angle slice, this third embodiment may locate and form a model of a number of headwind-tailwind pairs. The system employs an algorithm, which is used to select among possible range domain headwinds (or tailwinds, but not necessarily pairs). The algorithm, which permits selection among range domains, chooses, for each new angle slice, the range domain of the headwind (or tailwind) that most nearly matches the range of the prior angle slice headwind (or tailwind). Moreover, the selected headwind (or tailwind) Doppler velocity must lie within a bounded value of the prior angle slice headwind velocity value. In other words, a sense of range and Doppler velocity continuity is imposed on the azimuthal association process.

The detailed operation of the first embodiment will now be described with reference to FIGS. 3, 4, 5, and 6, which show an example of a velocity map and an amplitude map, respectively, as provided by the apparatus shown in FIG. 2.

Figure 3A:
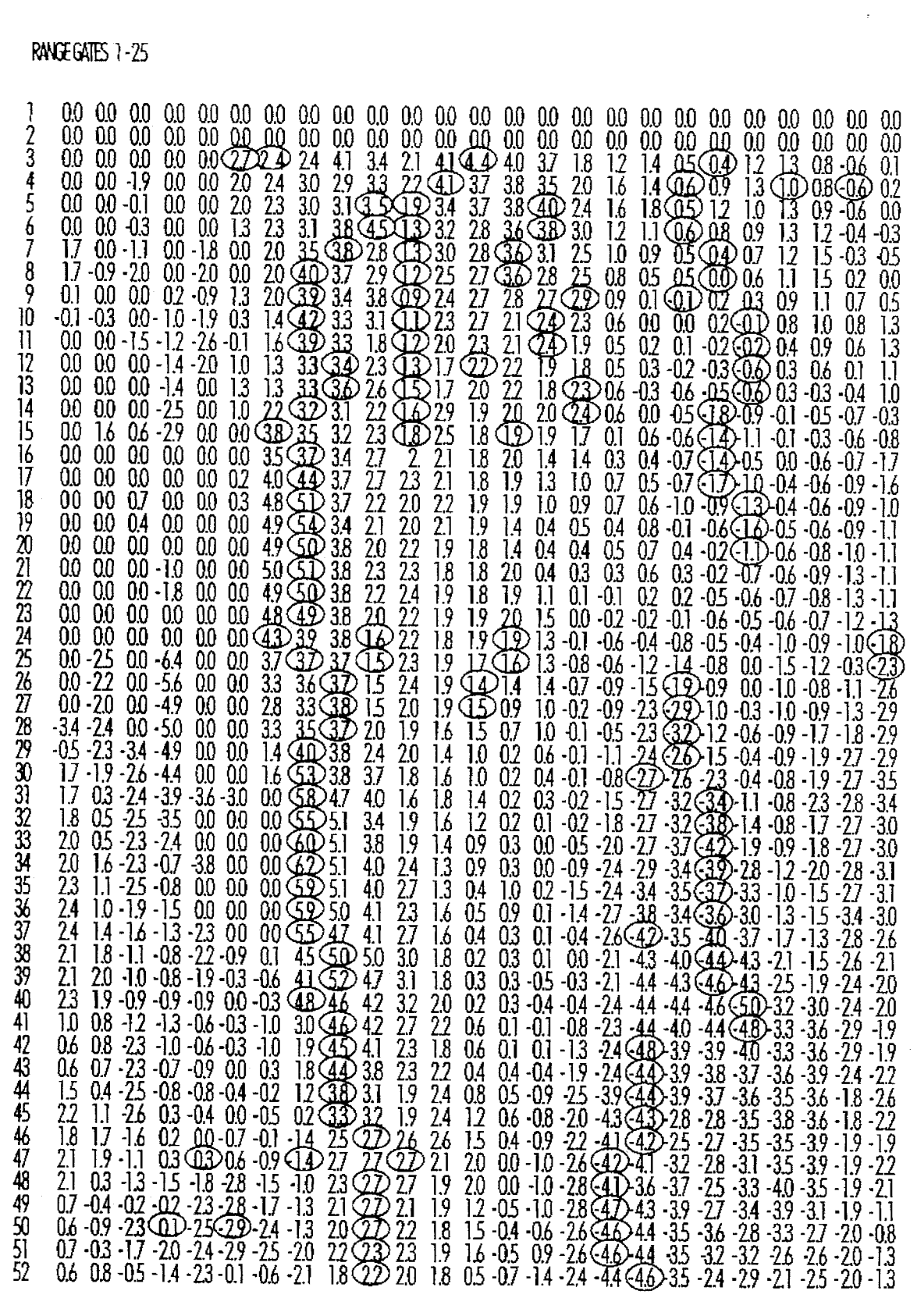
Figure 3B:
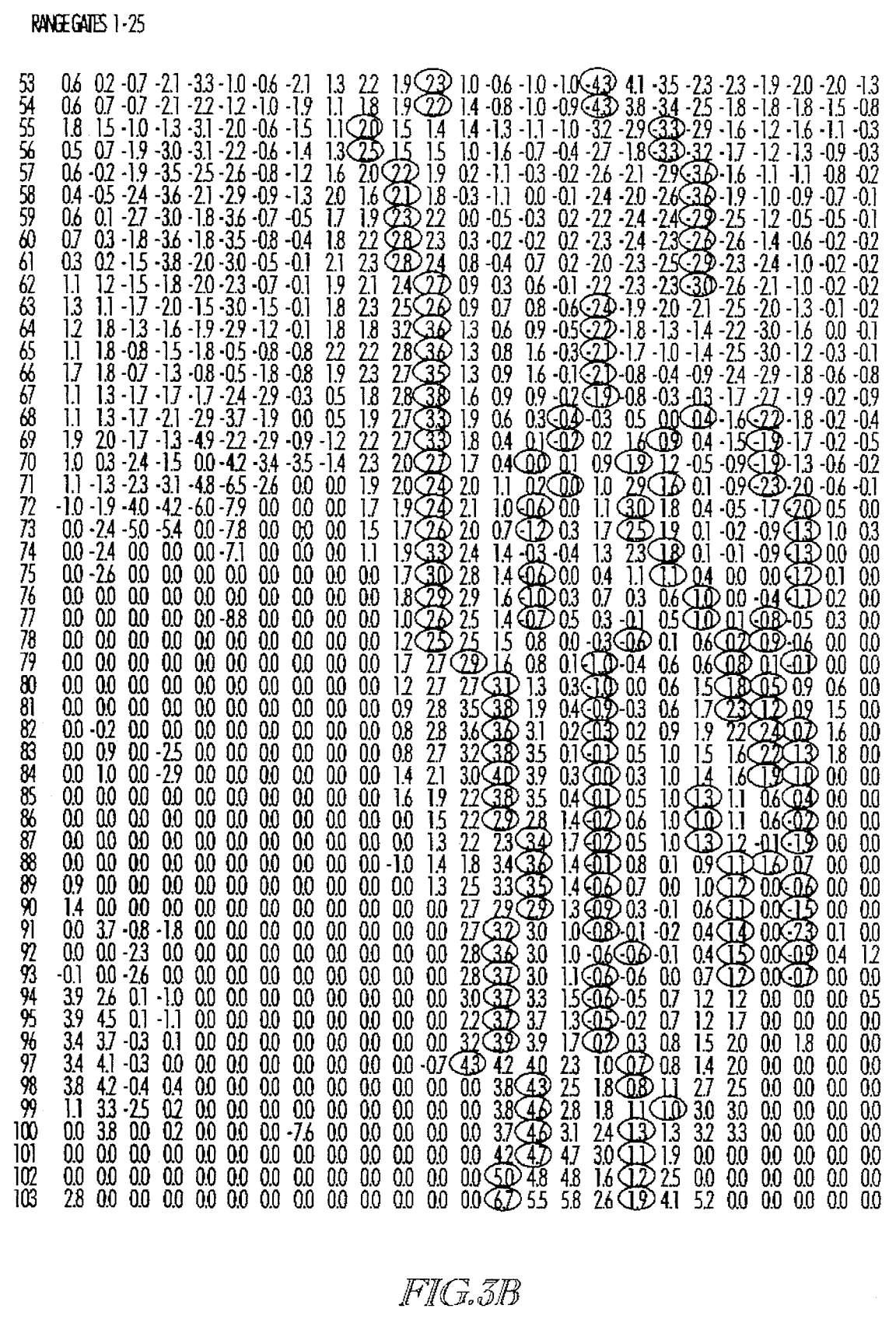

The velocity map of FIG. 3 shows winds in units of meters/second, rounded to the one significant fraction extracted by prior pixel processes with radar range running left to right and azimuth angle left (top) to right (bottom). FIG. 4 shows the corresponding amplitude map in units of dBz reflectivity. The velocity map shows certain pixels circled. These are to be understood by the order in which they are encountered, moving from left to right in order of increasing range pixel index, first encounter being headwind, second encounter tailwind, third circle headwind, and fourth tailwind.

The identification of headwind and tailwind velocity and range index values uses logical rules to decide whether a local maxima or minima is to be selected as the headwind/tailwind. These rules are not simple identification of local maxima or minima. Such a process would be mathematical rote. These rules are configured to determine headwind-tailwinds of hazardous windshear structures in the context of a low altitude encounter with a radar of specific spatial and Doppler resolving design. Their success may be viewed as empirical, i.e., from observations of the wind structures of hazardous windshear events, these rules have shown success in identifying local maxima and minima which subsequently persist azimuthally, associate in useful fashion, and reject nonhazardous structures.

For this data, which is a sample of winds collected from thunderstorms in Orlando, all reflectivities greater than −20 dBz. may be considered valid.

The headwinds and tailwinds for range domains are searched out first. Looping over angle index, i.e., from top to bottom, the first slice of utility is index 3, with nonzero velocity values. Using a convention for the first range domain greater or equal to range index 4, the selection of the headwind and tailwind range gate along each azimuth angle may be observed.

Tables 1 and 2, as shown in FIGS. 5 and 6, respectively, illustrate a register for tracking velocity values for the rage gates. The following table summarizes the register values of Tables 1 and 2:

PRG=Previous Range Gate Index

PVEL=Previous Range Gate Velocity

PDELV=Previous change in velocity

=current velocity−previous velocity

PABSDELV=abs(PDELV)

CRG=current range gate index

CVEL=velocity or current range gate index pixel

NRG=next range gate index

NVEL=velocity or current range gate index pixel

NDELV=NVEL−CVEL

NABSDELV=abs(NDELV)

HeadVel=headwind velocity

TailVel=tailwind velocity

HdRGate=range gate index of headwind

TlRGate=range gate index of tailwind

For slice 3, the process begins with invalid amplitudes in range gate 4 and range gate 5. Hence the first test is conducted with previous velocity PVEL, previous velocity change PDELV, and absolute value of previous velocity change PABSDELV initialized to absurd large values. The current velocity CVEL is set to an absurd large value because range gate 4 has no valid amplitude, and the values to the next velocity NVEL, the next change in velocity NDELV, and the absolute value of the next change in velocity NABSDELV are absurdly large. Incrementing of the range gate index produces no change until the current index CRG is 5, at which time the next velocity NVEL is set equal to 2.7 m/s and the amplitude is judged to be valid.

While the current range gate index CRG is 5, no record of headwind or tailwind is updated. The last operation while the range gate index CRG is 5 is the updating of the previous PVEL and current velocities CVEL, etc., with the values of current and next (i.e., a sliding window).

So, when the current range gate index CRG is equal to 6, the value of 2.7 m/s has been placed in the current velocity register CVEL. This gate is preceded in range by an invalid velocity and the subsequent gate is a valid amplitude, hence the change in velocity from the left (previous) PDELV is invalid and set to a large number as is the absolute value of the velocity change. However, the change in velocity to the right (next) NDELV is decreasing (−0.3), the next amplitude is valid, so the values for the next velocity change NDELV and the absolute value of the change NABSDELV are valid signifiers. Gate 6 is written as the headwind candidate gate HdRGate, the value of gate 6, 2.7 m/s, is written as the headwind velocity HeadVel, the marker is assigned a value 6, and the tailwind flag TlSet is set to permit tailwind assignment. Setting the tailwind flag eliminates the headwind flag HdSet inhibits further update of the headwind but permits update of the tailwind.

For the purposes of this example, assume that the velocity in range gate 7 is 2.40 and the value in range gate 8 is 2.42. Updating the registers places 2.7 in the previous velocity PVEL, 2.40 in the current CVEL, and 2.42 in the next NVEL. The previous change in velocity PDELV is −0.3 and the next change in velocity NDELV is +0.02. Hence, range gate 7 is written as the tailwind candidate gate TlRGate, the value of gate 7, 2.40 m/s, is written as the tailwind velocity TailVel, the value for marker is 7, and the tailwind flag TlSet remains set because the next range gate velocity value (2.42) is not greater than the existing headwind (2.7). However, the value of velocity in the next three range gates is not less than the selected tailwind, so that when range gate index 11 with velocity 2.1 is assigned to the current velocity CVEL, the difference between the current range gate index (11) and the marker value (7) is not less than 4, and the value for the tailwind in the first range domain can not be updated.

The second range domain for azimuth slice index 3 begins three indices greater than the range gate index of the tailwind of the first range domain (7+3=10). The initial conditions for the headwind-tailwind search are different because the search is interior to the radar data, i.e. not beginning at nearest range. The "previous" range gate data is considered valid and the first index is possibly valid. The search proceeds much as before, beginning at range gate 10 with current velocity CVEL of 3.4 m/sec. However, there is considerable more detail in the operation of the algorithm.

Table 2 (FIG. 6) shows the progression of pertinent register values as the current range gate index increments. The first notable operation is the continuance of headwind selection after range gate 11 because the next velocity NVEL (4.1) was sensed larger than the current headwind HeadVel (3.4). The tailwind flag register is not set, so the headwind velocity HeadVel is updated first with 4.1 and finally 4.4 for current range gate 13. After each update of the headwind, the headwind set procedure initializes the record for tailwind.

The tailwind registers begin to update at (current) range gate 14. Headwind update is disabled. At range gate 17, the value of +1.2 m/s is a local minima, but the tailwind is allowed to update for three indices past the last tailwind update, so first range gate 19 at 0.5 and then range gate 20 at 0.4 update the tailwind velocity TailVel. Although range gate 24 has a velocity (−0.6) less than the assigned tailwind register value TailVel, the difference in range gate index between it and the index of the current tailwind is greater than 3.

Different features of the headwind-tailwind formation are displayed in azimuth index 4. Again, the first values of amplitude are invalid, but, beginning with range gate index 6, valid velocity values are formed, and the logic of headwind selection is illustrated. The value for headwind and range gate index of the headwind is incremented. When the current range gate index equals 9, however, the trend of increasing velocities is not continued. The value of 2.9 is written for the tailwind velocity, but the tailwind flag is not set. The next range gate index, for velocity equal to 3.3, is allowed to update the headwind and range gate index of headwind. This continues until the current range gate index 13, with velocity value 3.7. Because every time the headwind is updated, the tailwind record is initialized, the index for tailwind and velocity for tailwind are written as 13 and 3.7 respectively, and, because the next velocity (3.8) is not greater than the assigned headwind, the tailwind flag is set, and marker is set to 20.

Subsequent velocities are less than the preceding tailwind assignment, including range gate index 20, velocity equal 0.6. The subsequent range gate index velocities are not less than the assigned tailwind until range gate index 24. However, the difference between the current range gate index (24) and marker (20) is not less than 4, so further update of the first range domain tailwind is effectively inhibited.

In summary, an algorithm, i.e., a set of mathematical-logical rules, has been described for determining relative (local) maxima and minima. These rules are unique to the windshear problem and the radar design by the selection of the spatial dimensions, for example, the usefulness of the three range gate index difference in continuing the search for tailwinds is in fact a reflection of the spatial scales of hazardous windshear, the nature of turbulence, and the radar range gate selection.

Once headwind and tailwind pairs can be identified along antenna lines-of-sight (LOS), the process of candidate formation is completed by azimuthally associating successive lines of sight into angle extensive velocity structures. Azimuthal association is a term from the technical literature which may be attributed to Terminal Doppler Weather Radar (TDWR). In general, a region of divergent outflow can be formed in angle by associating the range index of headwind and tailwinds using mathematical-logical rules.

The general principles of azimuthal association or stringing consist of deciding whether adjacent range located headwinds (or tailwinds) are continuous in both range location and velocity value. A candidate is a region of range-azimuth space which exhibits association over a sufficient extent.

In the case of multiple range levels, the mathematical-logical rules of stringing must deal with a multiplicity of headwind reports for example. The main operation is a loop over all range domains with a selection of the best (closest range index) selection of available headwinds. Subsequently, this closest headwind is qualified (accepted) if it is close enough in range and close enough in velocity. These values of range and velocity continuity are dependent upon the radar design, the nature of hazardous windshear (e.g., turbulence, scintillation), and the statistics of velocity distribution posed by ground moving clutter.

Exemplary values of range and velocity continuity are range gate difference of 2 and velocity difference of 2.0 m/s, respectively. Successive angle reports will be azimuthally associated together if successive range gate indices differ by no more than 2 and if their velocity values differ by no more than 2.0 m/s. A successive angle report being associated with a prior angle report may be said to associate if these rules are met and to not associate if they fail.

A valid candidate is a string of sufficiently successfully associated angle reports. A decision must be made whether to continue to try to associate successive angle reports to a prior (originating) angle report or to terminate a trial string and initiate a new string, using a more recent headwind-tailwind LOS report as the originating (seed) angle report. The decision to terminate or to continue is made by examination of the value of a register in relation with the number of angle slices tried. There is basically a more lenient infant stage, where greater tolerance is shown on the ratio of successes to failures, and a more mature, less tolerant stage.

If it is decided that the candidate in progress is to be terminated, it must also be decided where to begin the search for the next trial start. In the instance of multiple range levels, the history of associated LOS need not be continuous in range levels, i.e., range level 2 may furnish the best headwind match and range level 3 may furnish the best tailwind match. In beginning a new trial, it would be important to insure that hazardous windshear is not missed, i.e. that all unique starting LOS headwind-tailwind options are covered. Hence, a record of the last slice from the same range domain as the initiating headwind-tailwind options are covered. Hence, a record of the last slice from the same range domain as the initiating headwind-tailwind is maintained so that an ordered search using index incrementing is both exhaustive and nonduplicating. This furnishes a record of the most recent angle slice from the same range domain, hence, the last angle slice to be used. The next trial candidate may be initiated just beyond that index, which may be stored in a register hereinafter referred to as the LAST register.

The efficiency of examining the possibilities of multiple range levels is maintained by prohibiting headwind-tailwind reports from any range level from being included in more than one successful candidate. This principle of exclusion is implemented by maintaining a record of the range domain used to associate for each angle slice. When a successful candidate record is written, that list is used to edit the list of available headwinds or tailwinds for the respective angle slice.

Features of the algorithm for azimuthal association may be observed in operation on the velocity map shown in FIG. 3. The circled velocity pixels can be determined to be either headwind or tailwind depending on the order of occurrence in range along any line-of-sight. Beginning in order of increasing angle index (i.e., left to right), for example, with index 3, the first headwind range domain, using a 0 index value for first range gate, occurs at range gate index 5 and the first range domain tailwind is index 6. In the next angle slice, however, the nearest headwind is at range index 11 and the nearest tailwind is range index 18. These will, of course, be selected as the best matching headwind and tailwind, respectively, but both will be rejected by virtue of the range discontinuities.

No successful candidate will be spawned from the first range domain on angle index 3, but the first range domain of slice index 4 will spawn a successful candidate. From angle index 5, the headwind of the first range domain (3.5) and the tailwind from the second range domain (0.6) are both selected as the nearest respective maximum and satisfy both range and velocity continuity. In this fashion, a candidate is formed from the headwind of the first (near) range domain and the tailwind from the second (far) range domain, with the range of headwind at approximately range index 7 and the range index of tailwind at 18 or 19. This successful association continues until angle slice index 21, where the tailwind of nearest range is discontinuous in range by 3 range gates. This string always used the headwind of the first range domain, so the LAST register may be set to 20. Upon writing the candidate record, the values for the headwinds of the first domain and the values for the tailwinds of the second domain are removed from subsequent consideration, for instance, the consideration of candidates spawned by the second range domain of angle index 3.

A new trial candidate is initiated at angle slice 21 using the first range domain headwind (5.0) and tailwind (0.3), respectively. Angle slice 21 fails to spawn a successful candidate because the tailwinds are discontinuous in range. Because a valid candidate is not formed, the value in the LAST register is not considered, and the next trial candidate is initiated at angle slice 22.

The trial candidate spawned at angle slice 22 succeeds until angle slice 26, and no trial candidate will succeed to a valid (17) length until angle slice 42. The trial candidate spawned from the first range domain at angle slice 28 will associate 14 slices successfully, but the range discontinuity in tailwind at angle slice 41 prevents a successful candidate record, and all reinitializations between angle slice 28 and 42 are likewise doomed to fail because the ratio test for continuance is 95%, i.e., 19/20.

Angle slice index 42 spawns a successful candidate run from angle index 42 to angle index 62, inclusive. It is initially formed from range domain 1, but, from angle slice index 45 through 50, the headwind and tailwind of the first range domain are not the best range match to the preceding angle slice, and the second range domain is used. Consequently, when the record for the candidate is written, the values for the headwinds and tailwinds used in the candidate are invalidated for subsequent use, and the next attempted trial candidate begins with range domain 1 at angle slice index 63.

The trial candidate spawned at angle slice 63 by the first range domain associates successfully, using the headwinds and tailwinds of the first domain exclusively, through angle index 77. However, at angle index 78, the range discontinuity of the tailwinds prevents a valid candidate from being written. A successful candidate will be formed, however, from angle slice 79 through 103 using the first range domain headwind-tailwind data exclusively. Note also that a successful candidate will be formed during a loop over range domains for the second range domain at angle index 68 through 88.

In summary, the candidate report for this velocity map would amount to four candidates: one at the extreme left from angle index 4 through 20 with headwinds of about 4 m/s at range gate 7 and tailwinds of 0.5 to −1.5 at range index 19, a candidate in the middle from angle index 43 through 62 with headwinds of 2.5–4.0 m/s at range index 9 and tailwinds of −4.0 m/s at range index 17, and two candidates at the extreme right, from angle index 78 through 103 with headwinds of 3 m/s at range index 13 and tailwinds of −0.5 at range index 16, and, finally, from angle index 68 through 88 with headwinds of 2 m/s at range index 19 and tailwinds of −1.5 m/s at range index 22.

The range index and angle index of each respective headwind and tailwind velocity define a perimeter or locus of the local peak outflow in Doppler radar observation for each candidate. The winds, the included area, and the periphery of the candidate form essentially analytic and geometrical calculus relations for extracting the features (i.e., modelling parameters) of the velocity structure. The solutions for these parameters (i.e., extracted features) employ numerical approximations for simplification.

The locus defined by the range and angle indices may subsequently be utilized in the next aspect (embodiment) of the present invention which is described below.

Although most microbursts are circularly symmetric, asymmetric microbursts will result form non-normal impact with the ground which will produce some spatial and velocity asymmetry. If a model assuming circular symmetry is employed on highly non-circularly symmetric data, errors may result. Accordingly, a higher order, non-circularly symmetric model will be less susceptible to model mismatch limits to accuracy, the principal source of which is in the compensation of the Doppler wind velocity into the outflow of the model.

As a second embodiment of the present invention, an apparatus and method are provided for calculating a vertical component of a total hazard factor of a microburst downdraft. The apparatus comprises means for scanning and for identifying a microburst downdraft, means for deriving a non-circularly symmetric velocity model and for determining an upper horizontal outflow velocity, second scanning means, modifying means, means for second determining a lower horizontal outflow of velocity, and computing means.

In accordance with the present invention, means for deriving a non-circularly symmetric velocity model of an identified microburst downdraft is provided, from which the horizontal outflow velocity of the identified microburst downdraft can be determined. As embodied herein, the non-circularly symmetric velocity model is an elliptical velocity model, having an elliptical boundary. Preferably, this elliptical boundary is in the shape of an oval "racetrack."

Figure 7:
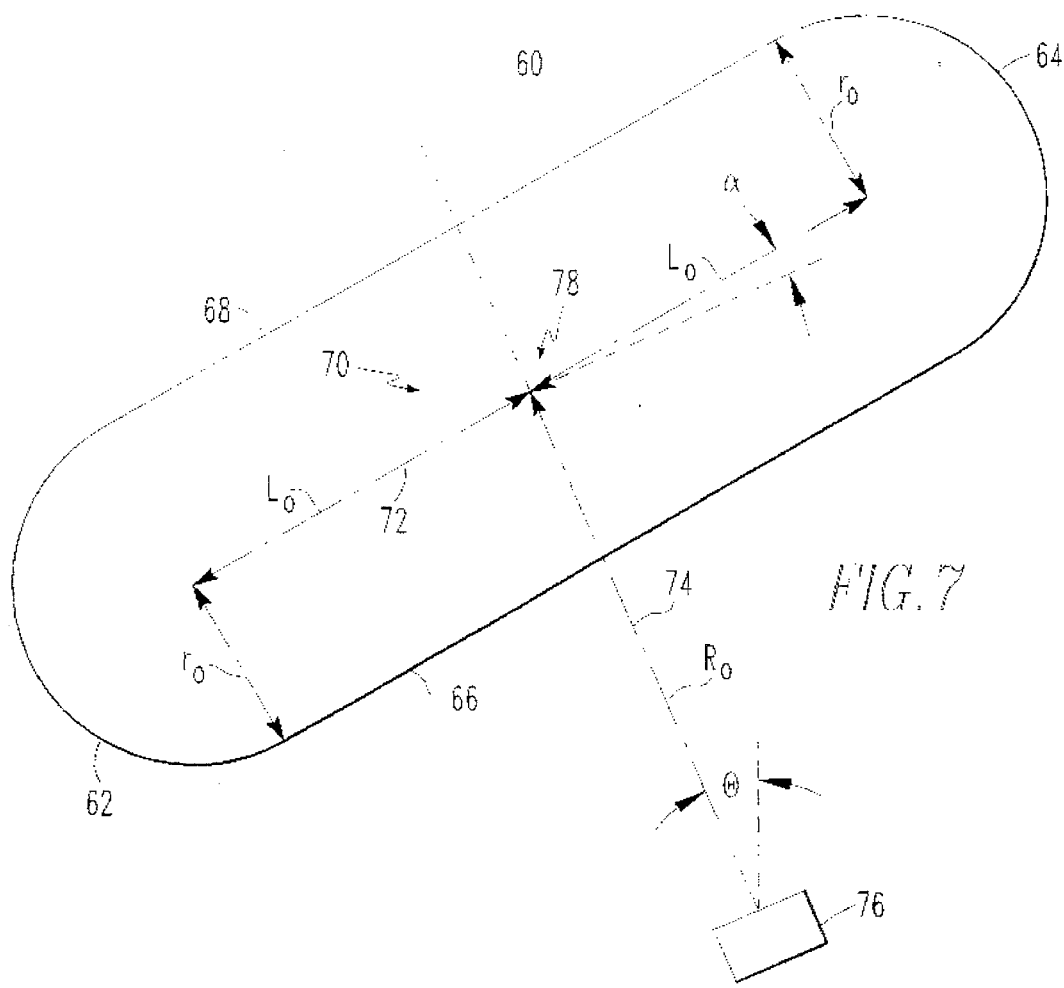
FIG. 7 is a diagram illustrating an example of a racetrack shaped model which may be employed in accordance with an embodiment of the present invention.

As shown in FIG. 7, the racetrack shaped elliptical velocity model 60 includes two halves of a circle 62, 64, coupled to one another by two substantially parallel and substantially straight lines 66, 68. Essentially, the racetrack 60 employs a circular model in the portion of the racetrack turns and extends the vertical velocity radial profile along the diameter of the circularly symmetric model as the profile in the rectangular straight-away portions 66, 68 of the racetrack. The racetrack model 60 furnishes continuity for the vertical velocity model between the sub-regions of the racetrack "infield" 70, without increasing the number of velocity unknowns in the model. The racetrack also has a major and a minor spatial dimension without additional velocity parameters.

In this racetrack model 60, identification of a microburst downdraft candidate 12 range-angle centroid is based on radar resolution cell area (first moment) weighting, rather than signal amplitude weighting. The range and the angle of each radar resolution cell along and/or within the peak outflow locus for the candidate are respectively multiplied by the range gate-cross range dimension of the respective cell. The centroids are extracted by normalizing with the accumulated area.

As shown in FIG. 7, the spatial dimensions of the racetrack 60, i.e., the length of the straight-away and the radius of the turns, are calculated from geometric relations of the circumference (defined by the equation $2\pi r_o + 4L_o$) and the area (defined by the equation $\pi r_o^2 + 4\pi r_o L_o$). The periphery of the racetrack model 60 is estimated by the incremental path length of a vector connecting adjacent radar resolution cell centers along the boundary of the derived non-circularly symmetric velocity model. The orientation of the racetrack 60 with respect to the source of the radar scanning means (i.e., the angle, $\alpha$, of the major axis 72 of the racetrack model relative to a vector 74 connecting the radar source 76 to the centroid 78 of the racetrack model) is calculated by an area weighted source angle to each interior radar resolution cell from the centroid 78. Calculation of the spatial configuration of the microburst downdraft candidate 12 employs an averaging ensemble of data points.

As is well-known in the art, the velocity flux for any closed curve is defined as the path integral of the outward directed velocity component, that is, a summation of products of the incremental path lengths along the periphery of the closed curve and the vector dot product between the velocity vector and the outward normal of the closed curve for the respective increment. For the oriented racetrack geometry as embodied herein, the outward directed velocity vector at each point along the peripheral boundary is calculated by assuming that the measured Doppler velocity was produced by the projection of an outflow oriented normal to the boundary along the radar line-of-sight. In other words, at any point along the racetrack 60 periphery, an outward directed normal unit vector may be computed from the oriented racetrack. Assuming that an outflow exists in the direction of the computed normal unit vector, the radar line-of-sight to the point at which the normal unit vector originates allows a construction of the angle between the outward normal unit vector and the line-of-sight. Therefore, a compensation can be calculated for the measured Doppler velocity to the outward normal velocity. The algorithm for deriving the outflow velocity using the racetrack model departs from the algorithm for a circularly symmetric model by the requirements to segment the respective periphery regions of the racetrack model to apply the respective geometry compensation rules for each region.

Figure 8:
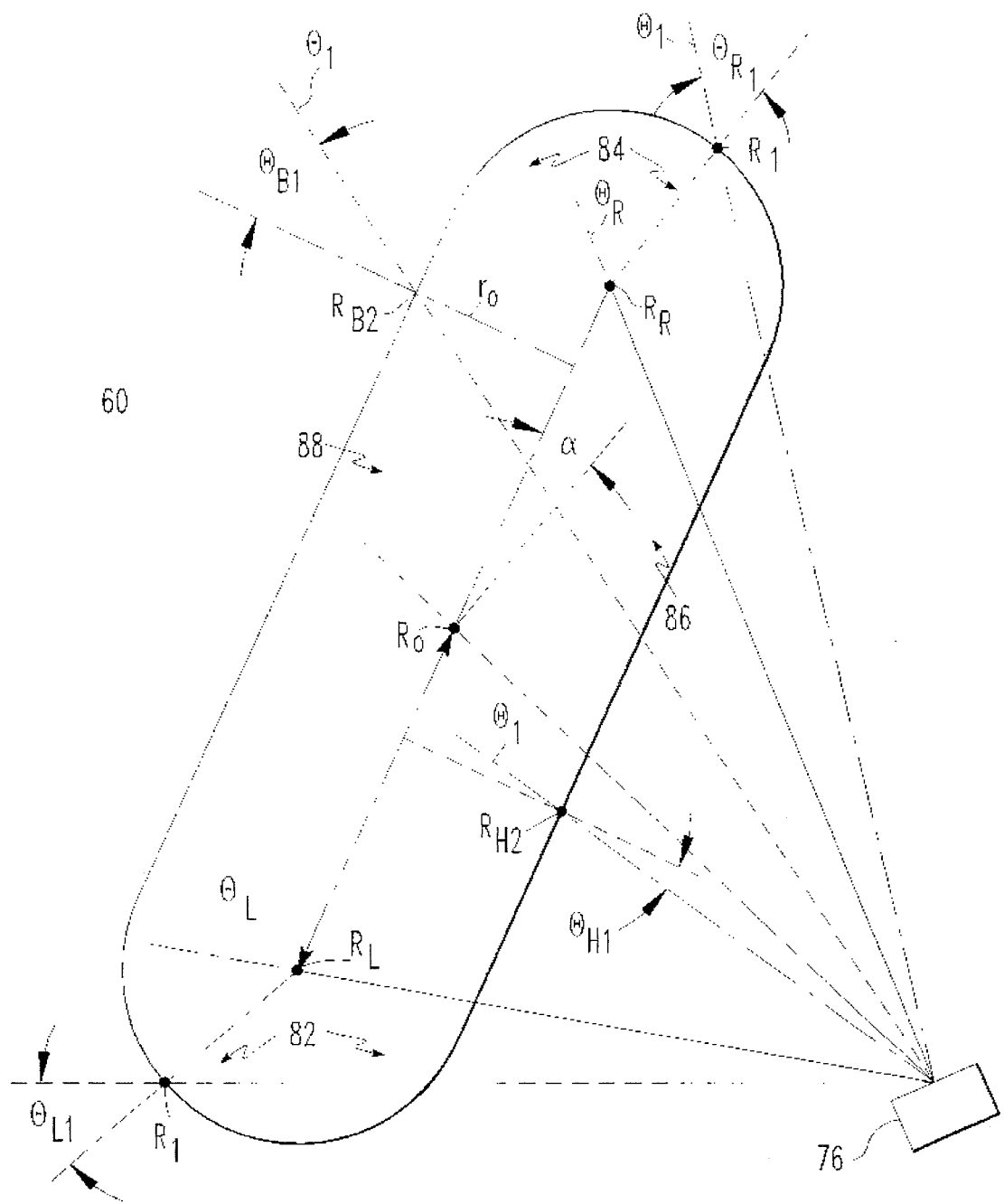
FIG. 8 is a diagram illustrating another example of a racetrack shaped model which may be employed in accordance with an embodiment of the present invention.

As shown in FIG. 8, the respective periphery regions of the racetrack 60 are defined as follows: the first region 82 is defined by one-half of the separated circle; the second region 84 is defined by the other half of the separated circle; the third region 86 is defined by the substantially straight line closest to the radar source 76; and the fourth region 88 is defined by the substantially straight line farther from the radar source 76. By compensation of the Doppler velocity at each point along the periphery by the respective regional geometry compensation rules to obtain an approximation of the outward normal velocity, and by direct (finite difference) calculation of the path length between each of the outward normal velocity vectors, the total outward flux emanating from the racetrack model 60, and the perimeter length of the racetrack model, are accumulated. By normalizing the total outward flux and the perimeter length, the averaged outflow velocity from the racetrack model is obtained. As embodied herein, the third embodiment of the present invention provides an apparatus and method for preventing underestimating of small radius microbursts, thereby biasing the total hazard factor significantly.

A concise mathematical expression is obtained which agrees qualitatively with observations from flight tests, namely, that at long ranges, hazardous microbursts are difficult to detect. As the sensor range closes, hazard factors underestimating biases, due to averaging effects along the range and cross-range dimensions of the resolution cell, decrease. Such biases arise from velocity spatial distribution curvature. The microburst outflow becomes well resolved in angle, the biases on the hazard factor decrease rapidly with closing range, and the hazard factor FBAR maps "crystallize" before the aircraft. Such effects are more pronounced in the altitude domain.

Such biases can arise from curvature in any dimensions, therefore, there are three possible sources of bias. In the elevation plane, stronger winds are located at lower altitudes. As the antenna illuminates the boundary layer, the resolution cell spectral average shear calculation result will be biased low. When less boundary layer overflow is illuminated, an overestimation of the windshear at the cell center may result from illumination of the peak outflow altitudes. In the azimuth and range dimensions, there will be little effect except for the smallest of radial outflow microbursts. If the sensor range averaging dimension is longer than the reference standard (i.e., 1000 m.), smaller radius microbursts may be seriously underestimated.

The approximations to produce these bias "rules of thumb" results are of good order. The elevation angle integral is separated from the range averaging integral with a constant altitude profile assumption. Any approximation in the length averaging is no more than differences between Oseguera-Bowles [1] model and Vicroy [2] model radial shape function functions. There is no approximation in the azimuthal dimension, except for a small angle expansion in the last step. In general, a spectral average type algorithm for estimating the velocity from a resolution cell return signal is implied, and it has been implicitly assumed that contributing differential increments are uniformly (constant reflectivity) weighted only by their volume.

Beyond its (qualitative) explanation of observed (RADAR and LIDAR) sensor range performance, this theory is important because known bias mechanisms can often be removed. Perhaps the greatest uncertainties to removing such bias are precision in the depth of outflow and the degree to which the encountered microburst exhibits Oseguera-Bowles-Vicroy (non-vortex) boundary layer stagnation flow.

The first order effects for the bias are, at closer ranges, where the outflow depth is resolved ($R_o \leq 15$ km., approx$_o$.), $$FBAR(\psi_B, R_o, r_o, B, L_o) = F_o\{1+(1/6)(\psi_B R_o/2z^*)^2 - (5/36)(L_o/2r_o)^2 (R_o\theta_b/2r_o)^2 (1/4)[L_{NASA}^4 - L_o^4]/(2r_o)^4 + \ldots\}$$

where $F_o$=the true range averaged horizontal hazard factor $z^*$=the characteristic altitude of the outflow, i.e., the altitude where the outflow velocity has decreased to half its peak value $\psi_B$=the antenna elevation beamwidth $\theta_B$=the antenna azimuth beamwidth $R_o$=the range to the center of the microburst $r_o$=the radius of the microburst outflow $L_0$=the length over which the horizontal hazard factor is calculated $L_{NASA}$=1000 m. (typical)

The range of predicted initial hazard detection for a microburst of outflow reflectivity $Z_{min}$, outflow radius $r_o$, and expected (true mean) FBAR of $F_o$ is $$R_p = Amin1[R_{rms}, R_a, R_1]$$

where $R_{rms}$=the rms accuracy limited radar range equation performance estimate =sqrt[$K_o Z_{min}$]

$K_o$=a radar range constant $Z_{min}$=the reflectivity of the microburst outflow region $R_e$=2Z~/$\psi_B$=2(400)/0.052=15.3 km.

=i.e., the range at which the bias effects in the elevation angle dimension on the true hazard are small enough $R_A$=the range at which the azimuth resolution bias is small enough.

$R_1$=a range limited by scan angle coverage in turning scenarios or azimuth extent (candidate formation).

Certification includes the validation of the missed detection and nuisance alert rates. In general, these probabilities are associated with the likelihoods of insufficient and marginal signal-to-noise returns from microbursts, respectively, and the accuracy of the equipment. The prior treatments [3,4] emphasized the rms accuracies and did not consider any bias errors. The results of that analysis were particularly illuminating with regard to so-called "dry" or low reflectivity microbursts where signal-to-noise limited accuracy would be the expected limiting factor in detection.

Many microbursts will not be minimally reflective, however, and detection would be limited to signal-to-noise only at very long ranges. At long ranges, the antenna beamwidth of the radar sensor will illuminate cross range dimensions in elevation and azimuth which may be significant portions of the microburst physical extent. If the cross-range resolution of the radar is not sufficient to localize the velocity measurement, the velocity reported for the cell (velocity map pixel) will be biased toward the slower speeds illuminated by the antenna. This bias arises due to curvatures (i.e., nonlinear spatial rates of change) in the velocity. These biases may be expected in both azimuth and elevation cross range dimensions for Oseguera-Bowles-Vicroy type microbursts.

In general, a hazard detection may be expected at ranges within the signal-to-noise limited range (as defined by outflow reflectivity) and when the biases (as defined by microburst outflow radius and depth of outflow) on the true FBAR are reduced enough for the expected (i.e., mean) calculated FBAR to lie above threshold. Predicted detection range is the minimum range where all conditions (i.e., total accuracy budget) for rms accuracy and bias accuracy (relative to the true hazard factor) are met.

Analysis of microburst radar detection generally begins with the premise that the spatial distribution of the winds is "well resolved" by the range and cross range dimensions of the radar resolution cell. "Well resolved" means that the velocities of the raindrops within the resolution cell do not vary appreciably over the volume of the cell, and the return may be said to be highly localized and/or iso-Doppler. When the volume of the resolution cell contains a spatially varying Doppler return, a spectral averaging type algorithm will weight each differential contributor within the resolution cell according to its volumetric reflectivity. If the reflectivity does not change appreciably over the resolution cell, then the volumetric averaged horizontal hazard factor should be informative of bias effects.

At near ranges, the cross-range dimensions of the radar resolution cell will be small, and the microburst wind structure will be known very accurately. At longer ranges, however, the altitudes in elevation and crossranges in azimuth illuminated by the antenna may be extensive enough to poorly characterize the radar return as "localized" and better characterized as "regionally averaged".

A definition of "localization range" might be the range at which the bias error between the Doppler velocity at the resolution cell center and the volume averaged Doppler velocity is on the order of the intrinsic (signal-to-noise limited) accuracy of the radar design budget.

Furthermore, when a bias error can be anticipated, it can usually be removed with improved results in detection range performance so long as uncertainties in the correction of the bias error to the mean do not compromise rms accuracy bounds.

Subsequent sections will formulate the bias in estimating velocity and/or hazard factor with a radar resolution cell due to the averaging effects over the volume of the cell. Essentially, this will amount to a description of the winds enclosed by the radar cell in radar coordinates superimposed upon the Oseguera-Bowles-Vicroy microburst wind structures in their local or source coordinates.

This formulation will be for a general range-azimuth coordinate field point, but results will concentrate along lines-of-sight containing the center (peak hazard) areas of the microburst. The integrand is expanded by a MacLaurin Series to allow a compact, functional simplification in analytic terms.

In altitude, it may be expected that the radar resolution cell must resolve the outflow within its characteristic dimensions. This will probably be smaller than the half velocity altitude ($z^*$) and somewhat larger than the altitude of peak outflow ($z_m$). (Note that, in the Oseguera-Bowles-Vicroy models of stagnation boundary flow, $z^*=4.545 z_m$, and that $z^*$ is typically about 400 meters [5] and $z_m$ about 80 meters.) The curvature effects in elevation may exhibit slight over-estimation bias because the rate of wind change is nearly linearly above the boundary layer, with greater rates of change near the altitude of peak outflow. When the altitude resolution is so coarse to include the boundary layer, the effect should be an underestimation. In azimuth, the cross-range (beamwidth) resolution should be somewhat less than the radius of the outflow, perhaps not as much as an order of magnitude. In azimuth, the bias should be apparent along the line of sight containing the microburst center and will be small only as the resolution cell is small compared to the outflow radius.

Figure 9:
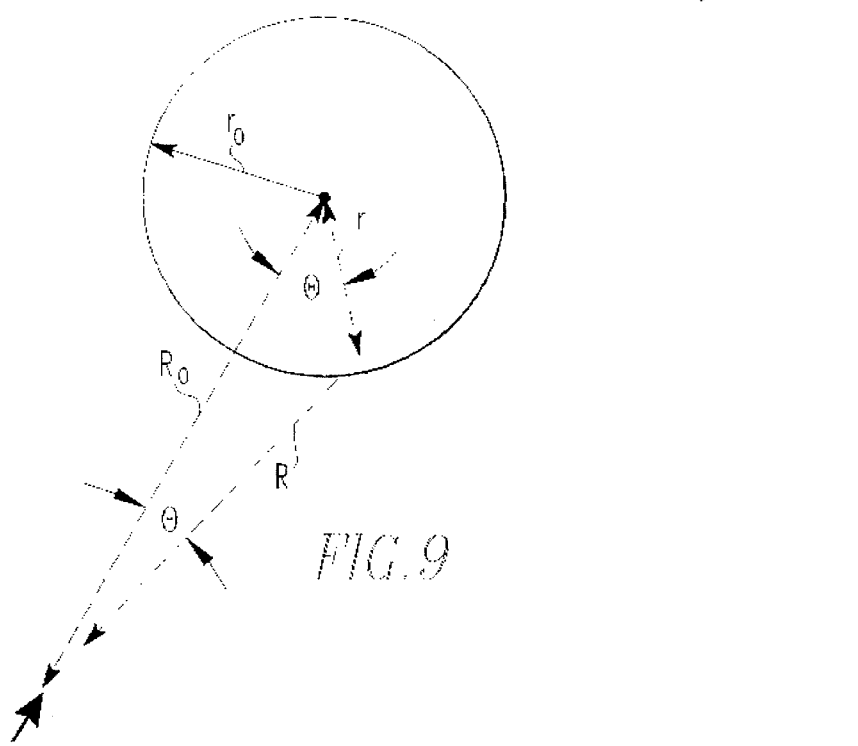
FIG. 9 is a plan view of an example of microburst geometry.

The geometry of FIG. 9 will be used to formulate regional averaging effects on FBAR, where $R_o$ = the range from the aircraft to the center of the microburst
$r_o$ = the radius of the peak outflow of the microburst
$r$ = the distance from the microburst center to the field
$R$ = the distance from the aircraft to the field point
$\theta$ = the squint angle between the line-of-sight from the aircraft to the field point and the line-of-sight to the center of the microburst
$\phi$ = the squint angle between the line-of-sight from the aircraft to the center of the microburst and the line-of-sight from the center of the microburst to the field point
$z$ = the altitude of the field point
$Z_o$ = the altitude of the beam aim point At any field point with respect to the microburst center, the radially directed wind is $u_r(r,z)) = A_o\, u_m\, p(z) g(r)/r_o$
where
$A_o$ = $\exp(+0.25)/p(z_m)$
$u_m$ = the peak outflow velocity (at altitude $z_m$)
$p(z)$ = the altitude shaping function of boundary stagnation flow
= $\exp(-z/z^*) - \exp(-12.5\, z/z^*)$
$g(r)$ = $r\exp[-0.25\, (r/r_o)^4]$ At any field point, the Doppler squint angle, $\alpha$, between the radially directed outflow and the radar line-of-sight is found from geometric relations $R/\sin(\phi)=r/\sin(\theta)=R_o/\sin(\alpha)$ $r^2=R_o^2+R^2-2R_oR\cos(\theta)$ $R_o^2 = R^2+r^2-2Rr\cos(\alpha)$ $\cos(\alpha)=[R^2+r^2-R_o^2]/2Rr=[R-R_o\cos(\theta)]/r$ At any point in radar coordinates $(R,\theta)$, the Doppler velocity from the microburst outflow is $u[r(R,\theta)]\cos(\alpha)$. Near the center of the microburst ($r \ll r_o$), the Doppler projection of radial velocity is $u[r(R, \theta)]\cos(\alpha)=A_o u_m p(z)(r/r_o)(1-(0.25)(r/r_o)^4]$ The horizontal hazard factor due to the rate of change of wind along the projected flight path (i.e., along the radar vector) is $F_H=[A_o u_m p(z) V_g/(r_o g)]\{[d[r\cos(\alpha)]/dR](5/4)(r/r_o)^4 \cos(\alpha) dr/dR\}$ Note that $r\cos(\alpha)=R-R_o\cos(\theta)$ $r^2=R_o^2+R^2-2RR_o\cos(\theta)$ $dr/dR=[R-R_o\cos(\theta)]/r$ So $d[r\cos(\alpha)]/dR=1.0$ and $r^4\cos(\alpha)dr/dR = [r\cos(\alpha)]r^2[R - R_o\cos(\theta)] =$ $r^2[R - R_o\cos(\theta)]^2 = [R^2 + R_o^2 - 2RR_o\cos(\theta)][R -$ $R_o\cos(\theta)]^2 = \{[R - R_o\cos(\theta)]^2 + R^2\sin^2(\theta)\}[R - R_o\cos(\theta)]^2 =$ $[R - R_o\cos(\theta)]^4 + R^2\sin^2(\theta)[R - R_o\cos(\theta)]^2$ To simplify the algebra, let $x=R/R_o$ $\xi=R_o/r_o$ Then $(r/r_o)^4 \cos(\alpha)\, dr/dR = \xi^{4}\{[x-\cos(\theta)]^4 + x^2\sin^2(\theta)[x-\cos(\theta)]^2\}$ $F_H=[A_o u_m p(z) V_g/(r_o g)]\{1-(5/4)\xi^4 h_1(x,\theta)\}$ where $h_1(x,\theta)=\{x^4(1+\sin^2(\theta))-x^3[4\cos(\theta)+2\cos(\theta)\sin^2(\theta)]+x^2\cos^2(\theta)[6+\sin^2(\theta)]-4x\cos^3(\theta)+\cos^4(\theta)\}$ $h_1(x,\theta) = \{x_4[2 - \cos^2(\theta)] + x^3[2\cos^3(\theta) - 6\cos(\theta)] +$ $x^2[7\cos^2(\theta) - \cos^4(\theta)] + x[-4\cos^3(\theta)] + \cos^4(\theta)\}$ Note that at the center of the microburst ($x=1$, $\theta=0$)

$H_1(1,0)=1-4+6-4+1=0$

So the normalized resolution cell horizontal hazard factor at the center of the microburst may be written for an antenna beam aimed along an elevation angle $\psi_o$ (at an altitude $z_o$) as $\rho(R_o, L_o, \theta_B, \psi_B) =$ $A_2 \int_{\psi=\psi_o-\psi_B}^{\psi_o+\psi_B} \int_{\theta=-\theta_B/2}^{\theta_B/2} \int_{x=1-x_o}^{1+x_p} p[z(x,\psi)]\{1 -$ $5/4)\xi^4 h_1(x,\theta)\} dx d\theta d\psi$ where $p[z(z_o,x,\psi)]=\exp[-z(z_o,x,\psi)/z^*]-\exp[-12.5\, z(z_o,x,\psi)/z^*]$ $p(z^*)=e^{-1}-e^{-12.5}-0.36788-0.00000373=0.36788$ $p(z_o)=\exp(-z_o/z^*)-\exp(-12.5 z_o/z^*)$ $A_2=[2x_o\theta_{B\psi B}]^{-1}=R_o/[L_o\theta_{B\psi B}p(z_o)D_1(x_o,0)]$ $L_o$ = the averaging range distance $\psi$=the elevation angle $\psi_b$=the elevation beamwidth of the antenna $\theta_B$=the azimuth beamwidth of the antenna $x=R/R_o$ $x_o=L_o/2R_o$ $z_o$=altitude of antenna elevation aim, 300 m.

$z^*$=altitude of outflow characteristic velocity $u_m/2$, typically 400 m.

The function $D_1(x_o, 0)$ accounts for range averaging in the calculation of FBAR, i.e., FBAR will be less than the horizontal hazard factor at the center of the microburst. In general, the normalizing hazard factor will bear the averaging effect of the standard length ($L_o=1000$ m.) which might differ from the sensor range window for shear computation.

$D_1(x_o,0) =$ $$(1/2x_o) \int_{x=1-x_o}^{1+x_o} [1-(5/4)\xi^4 h_1(x,0)]dx = 1 - (1/4)(L_o/2r_o)^4$$

Consider the integral over the elevation angle, $\psi$. At the longer ranges of interest, the antenna illumination will be at or near the half velocity altitude $z^*$ by design of the elevation control and auto-ranging. Hence, the term $\psi_o$ in the range of integration also means a range of altitudes about $z^*$. For small angles, the exponential arguments of $p(z)$ may be expanded into power series and the tangent function may also be expanded into a power series. The second exponential term will, however, have an argument which is not very small due to the ratio of the radar range to the outflow depth $z^*$—For $x=R/R_o$.

$$z(x,\psi_o+\psi)=z(z_o,x,\psi)=z_o+(xR_o)\tan(\psi)$$

Rewriting $p(z)$, $$p(z)=\exp(-z_o/z^*)\exp[-K_1\tan(\psi)]-\exp(-12.5z_o/z^*)\exp[-K_2\tan(\psi)]$$

where $K_1=x\ R_o/z^*$ $K_2=12.5\ x\ R_o/z^*$

The general integral of concern, normalized for the aim point, is $I(\psi_B,K) =$ $$[1/p(z_o)\psi_B] \int_{\psi=-\psi_B/2}^{\psi_B/2} \{\exp[-(z/z^*)-K_1\tan(\psi)] - \exp[-12.5(z/z^*)-K_2\tan(\psi)]\}d\psi$$

For small elevation beamwidths, the tangent of the angle is, to good approximation, equal to the angle [tan $(a)=a+a^3/3+2a^5/15+...$]. Consequently, $$I(\psi_B,K) \sim [1/p(z_o)\psi_B]\int_{\psi=-\psi_B/2}^{\psi/2} \{\exp[-(z/z^*)-K_1\psi]-\exp[-12.5(z/z^*)-K_2\psi]\}d\psi$$

$I(\psi_B,K) \sim \{1/\psi_n\}\{(-1/K_1)\exp[-z/z^*]-K_1\psi]-$ $(-1/K_2)\exp[(12.5\ z/z^*)-K_2\psi]\}$ Define the altitudes at the angles of the end points of integration $z_+=z_o+R_o\psi_B/2$ $z_-=z_o-R_o\psi_B/2$ Then, $I(\psi_B,R_o) \sim [\psi_B p(z_o)]^{-1}\{[z^*/R_o][\exp(-z_-/z^*)-\exp(-z_+/z^*)]-[z^*/12.5(R_o)][\exp(-12.5z_-/z^*)-\exp(-12.5z_+/z^*)]\}$ Note that for longer ranges, when the lower edge of the antenna beam does not illuminate outflow, the expression for $z_-$ may be changed to $z_-=0$. This will occur at ranges $z_o/R_o \leq \psi_B/2$, or $R_o \geq 2z_o/\psi_B$. For a typical $z^*=400$ m., an X-Band aperture of $3°$ beamwidth would exceed the lower outflow altitudes at about 15.3 km.

$p^{-1}(z_o) \sim \exp(+z_o/z^*)$

At $z=z_o=0.75\ z^*$ $p(z_o) = p(0.75\ z^*) =$ $\exp(-0.75) - \exp[-12.5(0.75)] = 0.472 - 0.000\ 008\ 482$ The above ratio over elevation may be considered fairly exact for pencil beamwidths. Its present form, however, is not illuminating on its biasing effects. If the expansions, higher order terms must be retained, otherwise, the power series approximation is linear and there would be no bias. Letting $y=\psi_B R_o/2z^*$ $I(\psi_b,R_o) \sim (1/2y)\{[\exp(y)-\exp(-y)]-(1/12.5)[\exp(12.5y)-\exp(-12.5y)]\}$ For small values of y, i e , $\psi_B R_o/2 << z^*$ $\exp(y)=1+y+y^2/2+y^3/6+...$ so $I(\psi_B,R_o) \sim (1/2y)\{2y+2y^3/6+2y^5/(51)...\}$ $I(\psi_B,R_o) \sim 1+y^2/6+y^4/(51)+...$ At short ranges, $R_o << 2z^*/\psi_B$, a bias due to outflow altitude extent illumination increases or over-estimates the horizontal hazard factor.

$I(\psi_B,R_o) \sim 1+(1/6)(\psi_B R_o/2z^*)^2$

However, at ranges approaching $R_o=2z^*/\psi_B$, the lower outflow velocities will cease to increase. The antenna illumination includes the stagnation layer, and the second exponential term becomes an important contributor and the exponential terms at the lower altitude ($z=0$) approach unity.

$I(\psi_B,R_o=2z^*/\psi_B)=\{(1/2y)\{\exp(y)1\}-(1/2y)\exp(-11.5z_o/z^*)\{\exp(-12.5y)-\exp(+12.5y)\}\}$ let $a=11.5/(12.5\ y)=23z_o/(12.5\psi_B R_o)=1$, then the boundary layer contribution is dominated by the last term, i.e., the term with the smallest exponential argument, $I(\psi_B,R_o=2z^*/\psi_B) \sim \{(1/2y)[y+y^2/2+y^3/6+...]+(1/25y)\exp[12.5y(1-a)]\}$ $I(\psi_B,R_o=2z^*/\psi_B) \sim \{[0.5+y/4+y^2/12+...]+(1/25y)\{1+12.5y(1a)$ $(12.5y)^2(1-a)^2 /2+(12.5y)^3 (1-a)^3(1-a)^3/(31)\}\}$ $I(\psi_B, R_o = 2z^*/\psi_B) \sim \{[0.5+y/4+y^2/12+\ldots]+(1/25y)+(1/2)(1a)+ (12.5y)(1-a)^2/2+(12.5y)2(1-a)^3/(31)\}\}$ $I(\psi_B, R_o = 2z^*/\psi_B) \sim \{[0.5+y/4+y^2/12+\ldots]+(1/2)-(11.5/25)(z_o/z^*)/y+ (1/25y)\}$ $I(\psi_B, R_o = 2z^*/\psi_B) \sim \{[0.5+y/4+y^2/12+\ldots]+0.5-0.46(z_o/z^*)/y+(1/25y)\}$ $I(\psi_B, R_o = 2z^*/\psi_B) \sim \{[1.0-0.46(z_o/z^*)(2z^*/\psi_B R_o) + 0.29(\psi_B R_o/2z^*)+ (_B R_o/2z^*)^2/12+\ldots\}$

~0.83

Figure 10:
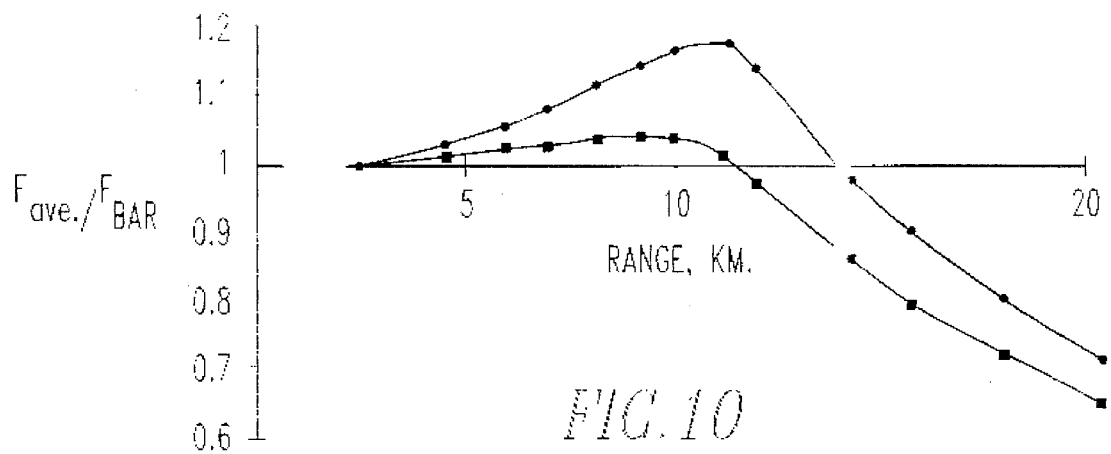
FIG. 10 is a graph delineating the elevation proportional bias as a function of the range to the microburst.

FIG. 10 delineates the elevation proportional bias as a function of the range to the microburst and illuminates the range of applicability for the approximations.

More compact outflows have stronger curvatures and will bias the horizontal shear more. The bias refers to the error between the resolution cell volumetric spectral average result relative to the point FBAR at the resolution cell center. Overestimation is possible because the winds at lower altitudes (i.e., nearer the peak outflow altitude $z_x$) are illuminated by the antenna. At longer ranges, the antenna will illuminate the boundary layer and the bias will change to underestimation. These results are based on antenna boresighted at a resolution cell center at z=300 m.

The objective in this section will be to solve the integral equation in the range dimension. This will be accomplished by straightforward integration, first in range and then, after re-arranging terms for the azimuth angle integration. Withdrawing the integration over elevation (i.e., not considering variation in altitude with range).

$\rho(R_o, L_o, \theta_B, \psi_B) =$ $$I(\psi_B, R_o)/[2x_o \theta_B D_1(x_o)] \int_{\theta=-\theta_B/2}^{+\theta_B/2} \int_{x=1-x_o}^{1+x_o} \{1 - (5/4)\xi^2 h_1(x,\theta)\} dx d\theta$$

$h_1(x,\theta) = \{x^4(2 - \cos^2(\theta)) - x^3[2\cos^3(\theta) - 6\cos(\theta)] + x^2 \cos^2(\theta)[7\cos^2(\theta)] - \cos^4(\theta)] - 4x\cos^3(\theta) + \cos^4(\theta)\}$ $D_1(x_o) = 1 - (1/4) (L_o/2r_o)^4$ The integral over the length dimension x may be solved in straightforward application. Note that $$\int_{1-x_o}^{1+x_o} x^n dx = [1/(n+1)]\{(1+x_o)^{n+1} - (1-x_o)^{n+1}\} =$$

$$[1/(n+1)] \left\{ \sum_{i=0}^{n-1} \binom{n+1}{i} (x_o)^i - \sum_{i=0}^{n-1} \binom{n+1}{i} (x_o)^i \right\}$$

where the binomial coefficient nomenclature means $$\binom{n+1}{i} = (n+1)!/\{(n-i+1)! (i)!\}$$

Only the odd power coefficients (i=2k+1, k=0,1,2,3, ...) will be nonzero.

$$\int_{1-x_o}^{1+x_o} x^n dx = [2/(n+1)] \sum_{k=0}^{(n+1)/2} \binom{n+1}{2K+1} (x_o)^{2k+1}$$

The integral over the length dimension has been solved, and the resulting expression may now be written in term of $x_o = L_o/2R_o$ and the integration over azimuth angle.

$\rho(R_o, L_o, \theta_B, \psi_B) =$ $$I(\psi_B, R_o)/(\theta_B) \int_{\theta=-\theta_B/2}^{+\theta_B/2} \{1 - (5/4)\xi^2 H_1(x_o, \theta)\} d\theta$$

where $H_1(x_o,\theta) = \{[1+2x_o^2+(1/5)x_o^4][2-\cos^2(\theta)]+[2+2x_o^{2||cos3}(\theta)-3\cos(\theta)]+[1+(1/3)x_o^2][7\cos^2(\theta)-\cos^4(\theta)][-4\cos^3(\theta)+\cos^4(\theta)]\}$ The integration over azimuth angle may be performed in a straightforward fashion. This integral consists of powers of cosines, which are tabulated for all the powers required. Begin by rewriting the integrand in terms of cosine power series, i.e., $\rho(R_o, L_o, r_o, \theta_B, \psi_B) =$ $$I(\psi_B, R_o)/[D_1(x_o)\theta_B] \int_{\theta=-\theta_B/2}^{+\theta_B/2} \{1 - (5/4)\xi^2 H_1(x_o,\theta)\} d\theta$$

where $H_1(x_o,\theta) = \{[2 + 4x_o^2 + (2/5)x_o^4] +$
$\cos(\theta)[-6 - 6x_o^2] +$
$\cos^2(\theta) [+6 + (1/3)x_o^2 - (1/5)x_o^4 +$
$\cos^3(\theta)[-2 + 2x_o^2] +$
$\cos^4(\theta)[-(1/3)x_o^2]$ The integral may be written $$\rho(R_o,L_o,r_o,\theta_B,\psi_B) = \frac{I(\psi_B,R_o)\{1 - (5/4)\xi^2 H_2(x_o,\theta_B)\}}{[1 - (1/4) (L_o/2r_o)^4]}$$

where, letting $\beta=\theta_B/2$ $H_2(x_o,2\beta) = \{[2 + 4x_o^2 + (2/5)x_o^4] +$
$[-6 - 6x_o^2](2/2\beta)[\sin(\beta)] +$
$[+6 + (1/3)x_o^2 - (1/5)x_o^4][2/2\beta][(\beta/2) +$
$(1/4)\sin(2\beta)] +$
$[-2 + 2x_o^2](1/12\beta)[9\sin(\beta) + \sin(3\beta)] +$
$[-(1/3)\cos^4](2/2\beta)[3\beta/8) +$
$(1/4)\sin(2\beta) + (1/32)\sin(4\beta)]\}$ Regrouping into a polynomial of sinusoid multiples, $H_2(x_o,2\beta) = \{[5 + (97/24)x_o^2 + (3/10)x_o^4] +$
$[(-15/2) - (9/2)x_o^2](1/\beta)\sin(\beta) +$
$[(3/2) - (1/20)x_o^4](1/\beta)\sin(2\beta) +$
$[(-1/6) + (1/6)x_o^2](1/\beta)\sin(3\beta) +$
$[-(1/96)x_o^2](1/\beta)\sin(4\beta)\}$ The expression for $H_2(x_o,\theta_B)$ essentially completes the bias effects. However, in the case of small beamwidths ($\theta_B \ll 1$ i.e., $\theta_B \ll 60°$), a small number expansion may provide insight and "rules of thumb". Expanding the sinusoids in MacLaurin's Series $[\sin(x) \sim 1-x+(1/31)x^3+(1/51)x^5-\ldots]$ $$H_2(x_o,2\beta) = \{[5 + (97/24)x_o^2 + (3/10)x_o^4] +$$
$$[(-15/2) - (9/2)x_o^2](1)[1 - (1/6)\beta^2 +$$
$$(1^4/120)\beta^4 - (1^6/7!)\beta^6 + \ldots] +$$
$$[(3/2) - (1/20)x_o^4](2)[1 - (4/6)\beta^2 +$$
$$(2^4/120)\beta^4 - (2^6/7!)\beta^6 + \ldots] +$$
$$[(-1/6) + (1/6)x_o^2](3)[1 - (9/6)\beta^2 +$$
$$(3^4/120)\beta^4 - (3^6/7!)\beta^6 + \ldots] +$$
$$[-(1/96)x_o^2](4)[1 - (16/6)\beta^2 +$$
$$(4^4/120)\beta^4 - (4^6/7!)\beta^6 + \ldots]\}$$

$$H_2(x_o,2\beta) = \{[5 - (15/2) + 3 - (1/2)] +$$
$$x_o^2[(97/24) - (9/2) + (1/2) - (1/24)] +$$
$$x_o^4[(3/10) - (1/10)] +$$
$$\beta^2[+(15/12) - (24/12) + (9/12)] +$$
$$\beta^2 x_o^2[+(9/12) - (9/12) + (4/36)] +$$
$$\beta^4(1/5!)[(-15/2) + 48 - (81/2)] +$$
$$\beta^2 x_o^4(1/15) + \ldots O(\beta^4 x_o^2)\}$$

The first terms are of fourth order, and solely angle dependent terms do not appear till sixth order. This suggests that, for $L_o/2R_o$, $R_o\theta_B/2r_o \ll 1$, to very good accuracy, $$H_2(x_o,\beta) = (1/5)x_o^4(1/9)x_o^2\beta^2$$

and, finally, the normalization contributed by the denominator will tend, to first order ($L_o \ll 2\, r_o$), to leave only the cross-product term as dominant.

$$1/D_1(x_o) = 1/D_1(L_o/2R_o) = 1 + (1/4)(L_o/2r_o)^4$$

so, if the sensor practical resolution length for windshear calculation equals the standard reference length and the microburst radius is larger than the averaging length ($L_o \ll 2\, r_o$)

$$F(\psi_B, R_o, r_o, \theta_B, L_o) = F_o J(\psi_B, R_o)\{1 - (5/36)(L_o/2r_o)^2(R_o\theta_B/2r_o)^2\}$$

At closer ranges, where the outflow depth is resolved ($R_o \leq 15$ km., approx.), $$F(\psi_B, R_o, r_o, \theta_B, L_o) = F_o\{1 + (1/12)(\psi_B R_o/2z/z^*)^2 -$$
$$0.46(z_o/z^*)(2z^*/\psi_B R_o) +$$
$$0.29(\psi_B R_o/2z^*) -$$
$$(5/36)(L_o/2r_o)^2(R_o\theta_B/2r_o)^2\}$$

For very small microburst outflow radii, any difference in the sensor range window dimension and the standard reference length may provoke large errors. Essentially, the range averaging factors for the numerator and the denominator will no longer equal small numbers perturbing unity and a factor $$\frac{[1 - (1/4)(L_o/2r_o)^4]}{[1 - (1/4)(L_{NASA}/2r_o)^4]} = 1 - \frac{[L_o^4 - L_{NASA}^4]}{(2r_o)^4}$$

If $L_o > L_{NASA}$ and $L_o > r_o$, this bias may be very severe. This effect arises because a large-range window may include portions of the outflow beyond the radius of peak outflow.

Figure 11:
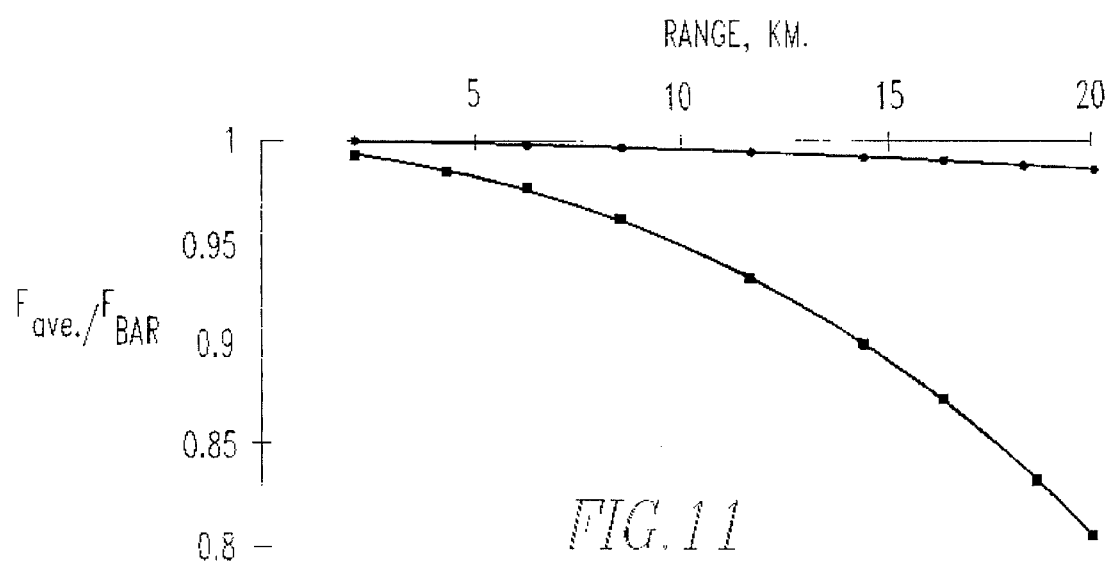
FIG. 11 is a graph delineating the azimuth bias effects as a function of the range to the microburst.

Simple rules of thumb, using ratios of microburst geometric dimensions to subtended resolutions of the sensor, have been formulated to predict under-estimation of the horizontal hazard factor at long ranges and the improvement in estimating the mean at closer ranges. FIG. 11 shows the azimuth bias effects as a function of range. When estimates of key microburst physical dimensions are available, this bias may be reduced. Preferably, algorithms for reducing resolution cell biases should be over-damped (i.e., not prone to over-estimating) to prevent nuisances.

With a 300 meter range gate width, compensation to the horizontal hazard factor, as a function of the lower bar outflow radius, will be required to detect and demonstrate accuracy against small radii MUST ALERT events, including the NASA database cases DENVER "very dry," DENVER temperature inversion, and Montana gust front. The compensation is dependent on the accuracy of the outflow radius for its success. Improvements to the extraction of outflow radius in the lower bar are described below.

Figure 12:
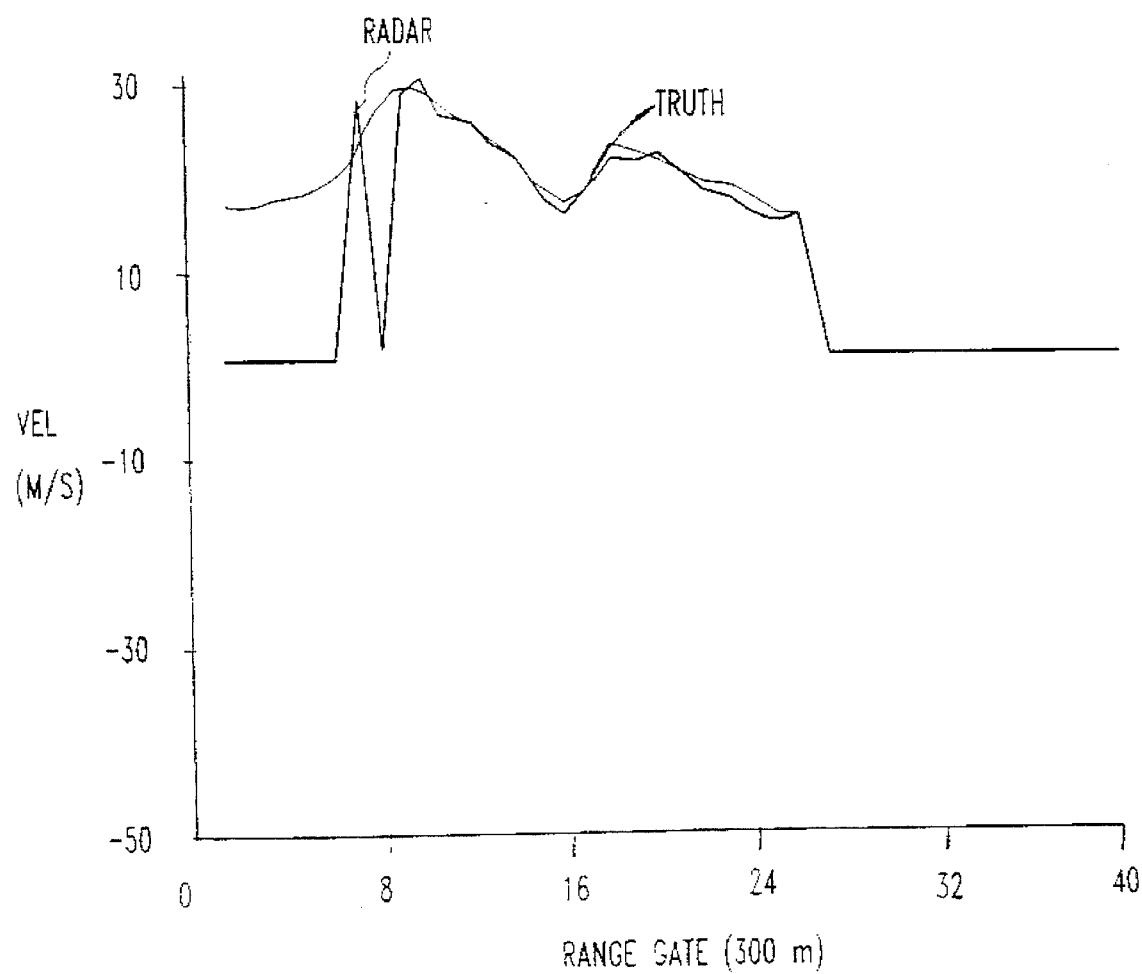
FIG. 12 is a graph showing a profile comparison of radar upper bar velocity and true upper bar velocity.
Figure 13:
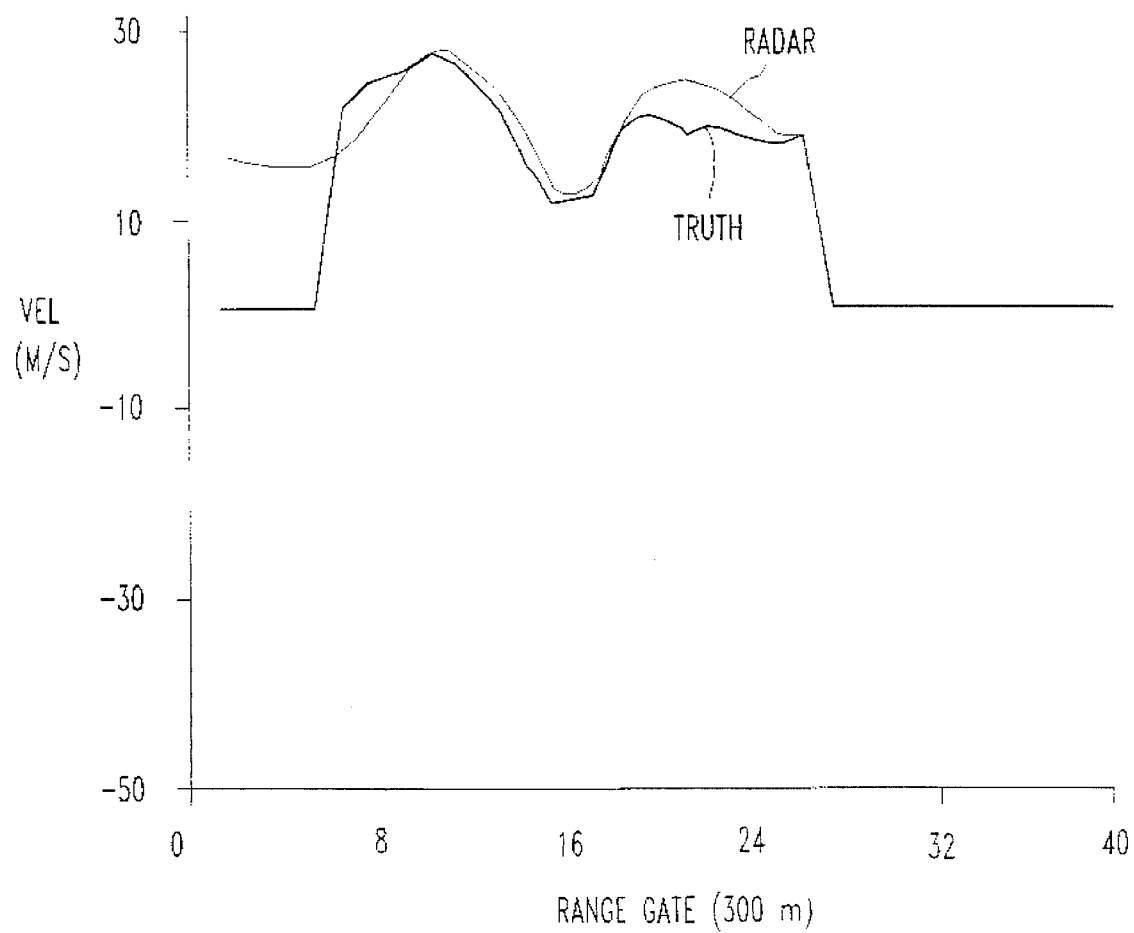
FIG. 13 is a graph showing a profile comparison of radar lower bar velocity and true upper bar velocity.
Figure 14:
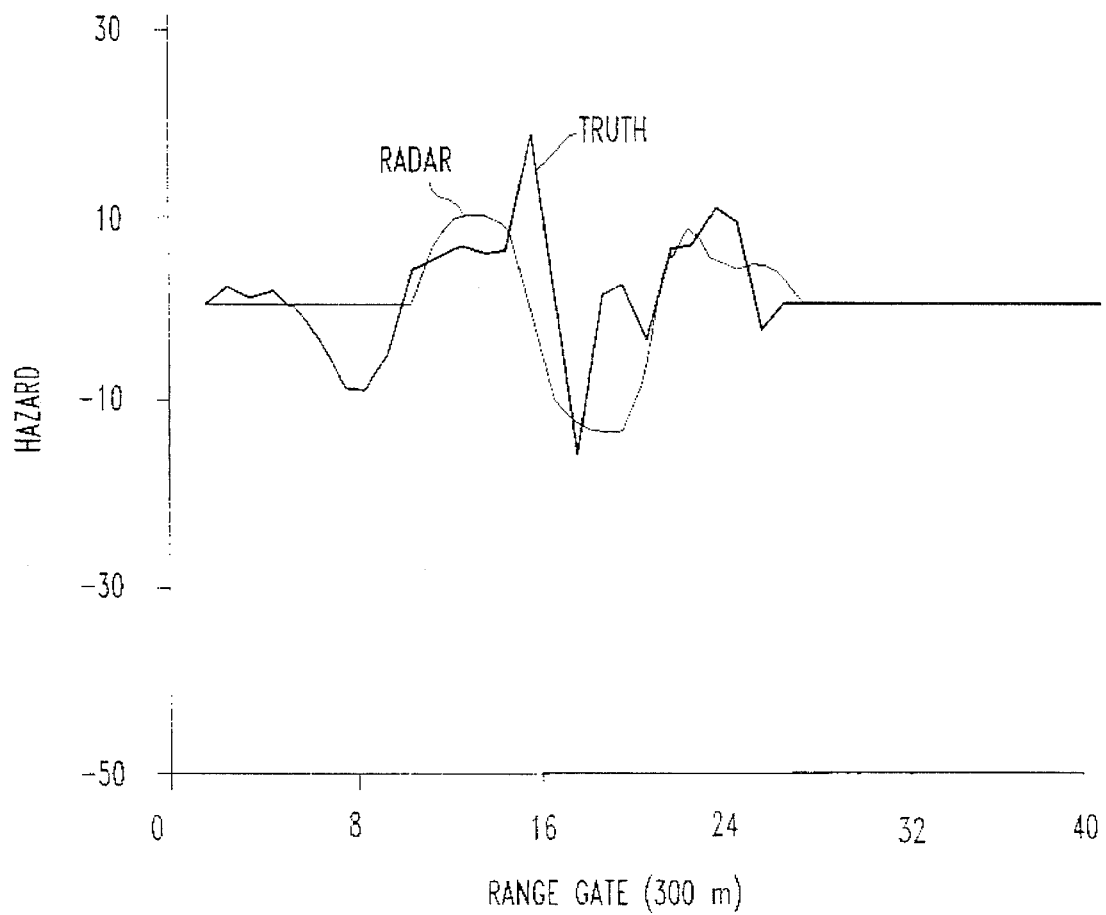
FIG. 14 is a graph showing a profile comparison of radar hazard factor and true hazard factor (lower bar).

The combined processes of least mean square slope fitting and averaging of the total hazard factor in range (to produce FBAR) can bias the resulting hazard factor significantly. With the exception of some 2 of 2 editing, the velocity extraction for the upper and lower bars (see FIGS. 12 and 13) disagrees with truth only due to spatial averaging due to the radar resolution cell. However, despite the excellent velocity correspondence at the ranges of the wind transition, the horizontal hazard (see FIG. 14) seriously underestimates the true (unaveraged) horizontal hazard.

The earlier treatment on biases developed a formula for the horizontal hazard factor of a sensor with characteristic range windowing in terms of a reference (e.g., NASA 1000 km FBAR) for Oseguera-Bowles spatially structured microburst $$F_1 = F_o \frac{[1 - .25(L_1/2r_o)^4]}{[1 - .25(L_o/2r_o)^4]}$$

where $F_1$ = measured horizontal hazard factor of effective sensor system window process $L_1$ = sensor system characteristic range window $F_o$ = reference range averaged horizontal hazard factor (FBAR)

$L_o$ = references averaging range dimension (e.g., 1000 meters)

$r_o$ = outflow radius of Bowles-Oseguera microburst

If the range window of the sensor is larger than the reference ($L_1 > L_o$), the measured horizontal hazard will underestimate the true (reference) hazard. Conversely, if the reference window dimension and the outflow radius are known, then a measurement may be compensated by multiplying the measurement by a dependent quantity, $$F_2 = F_1 * C(r_o)$$

$$C(r_o) = \frac{[1 - .25(L_o/2r_o)^4]}{[1 - .25(L_1/2r_o)^4]}$$

Compensation of a sensor system with a large-range window may be compensated by knowing the characteristic dimension of the sensor system process and the diameter of the measured event.

In the case of MODAR, the 300-meter range gate and the five-point amplitude weighted LMS algorithm furnish an effective window probably somewhat larger 1500 meters. From simulation, comparison of nonrange averaged horizontal hazard factors for known events can furnish information for observing the characteristic range dimension of the sensor system process for particular (generalizable) events. From the true hazard factor maps, clusters of range-averaged MUST ALERT regions may be identified. The corresponding pixels in the radar data hazard factor maps may be identified. For this particular case, the measured FBAR is $F_1 \sim 0.1025$ and the true FBAR is $F_o \sim 0.139$. From the velocity profiles, the peak headwind and tailwind are separated by about 1632 meters, suggesting a characteristic range window of 1726 meters.

In mechanizing a correction algorithm, it is preferable to avoid bipolar corrections, i.e., avoid singularities. The compensation is limited in scope to those events with radii which are not too small. As a perturbation, the effect of small radii is first observed for compensation as $$C_1(r_o) \times 1 + 0.25[(L_1)^4 - (L_o)^4]/(2r_o)^4$$

which, given $L_1 > L_o$, is not prone to singularity or bipolarity. The numerator (terms within the square brackets) is operationally a constant, dependent only upon a sensor characteristic and the known reference. It might be hoped that the sensor characteristic was established robustly for several cases of microbursts, etc., of varying reflectivity and outflow dimension, but, from theory, it should be expected to be a constant, invariant with event. The compensation is adaptive through its parameterization with outflow radius. From the results using the velocity profiles and hazard maps, $L_1 = 1725$ m., and the compensation simplifies to $$\begin{aligned} C_1(r_o) &= 1 + .25*(1675/2r_o)^4 \\ &= 1 + (592.2/r_o)^4 \end{aligned}$$

or, for the "C" code, $$\text{bias} = 1 + (\text{RadarBar/sgCandidate[Candidate].LowerRadius})^4$$

where Radarcorr=592.2 meters.

The operational success of a bias compensation algorithm will lie in the accuracy of outflow radius measurement. A measure of outflow radius is available within this general method through the extracted features of the outflow.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A radar system for determining a vertical component of a total hazard factor of a microburst, comprising:

means for scanning the atmosphere at an upper altitude and identifying said microburst;

means for deriving spatial parameters of a non-circularly symmetric velocity model of said identified microburst;

means for determining an upper horizontal outflow velocity of said identified microburst using said non-circularly symmetric velocity model;

means for scanning the atmosphere at a lower altitude;

means for modifying said spatial parameters of said non-circularly symmetric velocity model to correspond to the shape of said identified microburst at said lower altitude;

means for determining a lower horizontal outflow velocity of said identified microburst using said modified non-circularly symmetric velocity model; and means for computing said vertical component of said total hazard factor from said upper horizontal outflow velocity, said lower horizontal outflow velocity, said modified spatial parameters of said non-circularly symmetric velocity model.

2. The radar system recited in claim 1, wherein the non-circularly symmetric velocity model is an elliptical velocity model having an elliptical boundary.

3. The radar system recited in claim 2, wherein the elliptical boundary has an oval racetrack shape defined by two separated halves of a circle coupled to each other by two substantially parallel and substantially straight lines.

4. The radar system recited in claim 3, wherein said means for determining an upper horizontal outflow velocity and said means for determining a lower horizontal outflow velocity each includes:

means for calculating, at a plurality of points along the elliptical boundary, a plurality of velocity vectors, said calculating means employing a set of circular geometric compensation rules for the two separated halves of the circle and a set of linear geometric compensation rules for the two substantially parallel and substantially straight lines;

means for calculating a plurality of path lengths between said plurality of points, each of said plurality of path lengths corresponding to the distance along the elliptical boundary between an adjacent pair of said plurality of points;

means for accumulating said plurality of velocity vectors and for accumulating said plurality of path lengths; and means for normalizing said accumulated velocity vectors and said accumulated path lengths.

5. The radar system recited in claim 4, further comprising means for generating a radar sight line and for measuring a velocity data value along said radar sight line for each of the plurality of points, wherein the means for calculating the plurality of velocity vectors comprises, for each of the plurality of points, means for determining an angle between said radar sight line and a vector normal to the elliptical boundary, and means for compensating said velocity data value by said angle to obtain the velocity vector.

6. A method for determining a vertical component of a total hazard factor of a microburst, comprising:

radar scanning the atmosphere at an upper altitude and identifying said microburst;

deriving spatial parameters of a non-circularly symmetric velocity model of said identified microburst;

determining an upper horizontal outflow velocity of said identified microburst using said non-circularly symmetric velocity model;

radar scanning the atmosphere at a lower altitude;

modifying said spatial parameters of said non-circularly symmetric velocity model to correspond to the shape of said identified microburst at said lower altitude;

determining a lower horizontal outflow velocity of said identified microburst using said modified non-circularly symmetric velocity model; and computing said vertical component of said total hazard factor from said upper horizontal outflow velocity, said lower horizontal outflow velocity, and said modified spatial parameters of said non-circularly symmetric velocity model.

7. The method recited in claim 6, wherein the non-circularly symmetric velocity model is an elliptical velocity model having an elliptical boundary.

8. The method recited in claim 7, wherein the elliptical boundary has an oval racetrack shape defined by two separated halves of a circle coupled to each other by two substantially parallel and substantially straight lines.

9. The method recited in claim 8, wherein the step of determining an upper horizontal outflow velocity and the step of determining a lower horizontal outflow velocity each includes the following substeps:

calculating, at a plurality of points along the elliptical boundary, a plurality of velocity vectors, said calculating substep employing a set of circular geometric compensation rules for the two separated halves of the circle and a set of linear geometric compensation rules for the two substantially parallel and substantially straight lines;

calculating a plurality of path lengths between said plurality of points, each of said plurality of path lengths corresponding to the distance along the elliptical boundary between an adjacent pair of said plurality of points;

accumulating said plurality of velocity vectors and said plurality of path lengths; and normalizing said accumulated velocity vectors and said accumulated path lengths.

10. The method recited in claim 9, further comprising the step of generating a radar sight line and measuring a velocity data value along said radar sight line for each of the plurality of points, wherein the substep of calculating the plurality of velocity vectors comprises, for each of the plurality of points, the substeps of determining an angle between said radar sight line and a vector normal to the elliptical boundary, and of compensating said velocity data value by said angle to obtain the velocity vector.

11. A radar system for determining a horizontal outflow velocity of a microburst, comprising:

means for identifying said microburst;

means for deriving an elliptical spacial model of said identified microburst, wherein the boundary of the elliptical spacial model is defined by two separated halves of a circle coupled to each other by two substantially parallel and substantially straight lines; and means for calculating said horizontal outflow velocity from said elliptical spacial model.

12. The radar system recited in claim 11, wherein the calculating means includes means for calculating the horizontal outflow velocity at a plurality of altitudes.

13. A method for determining a horizontal outflow velocity of a microburst, comprising:

identifying said microburst using a radar system;

deriving an elliptical spacial model of said identified microburst, wherein the boundary of the elliptical spacial model is defined by two separated halves of a circle coupled to each other by two substantially parallel and substantially straight lines; and calculating said horizontal outflow velocity from said elliptical spacial model.

14. The method recited in claim 13, wherein the calculating step includes the substep of calculating the horizontal outflow velocity at a plurality of altitudes.

15. A radar system for forming a microburst candidate, comprising:

means for incrementally scanning the atmosphere in an angular swath having a plurality of angle report points;

means for determining, at each of said plurality of angle report points, a peak headwind and a peak tailwind, each having a range from said radar system and a velocity;

means for detecting a start point of said microburst candidate;

means for detecting a stop point of said microburst candidate by comparing the range and velocity of the peak headwind and peak tailwind determined at a final incremental angle report point with the range and velocity determined at a previous incremental angle report point immediately preceding said final incremental angle report point; and means for designating the width of said microburst candidate as the distance from said start point to said previous incremental angle report point.

16. The radar system recited in claim 15, further comprising means for restarting the incremental scanning means relative to the stop point.

17. The radar system recited in claim 15, wherein the detecting means includes means for determining whether the range and velocity of the peak headwind and/or peak tailwind determined at a target one of said plurality of angle report points substantially differs from the range and velocity of the angle report point immediately preceding said target report point.

18. A method for forming a microburst candidate using a radar system, comprising:

incrementally radar scanning the atmosphere in an angular swath having a plurality of angle report points using a radar system;

determining, at each of said plurality of angle report points, a peak headwind and a peak tailwind, each having a range from said radar system and a velocity;

detecting a start point of said microburst candidate;

detecting a stop point of said microburst candidate, including comparing the range and velocity of the peak headwind and peak tailwind determined at a final incremental angle report point with the range and velocity determined at a previous incremental angle report point immediately preceding said final incremental angle report point; and designating the width of said microburst candidate as the distance from said start point to said previous incremental angle report point.

19. The method recited in claim 18, further comprising restarting the incremental radar scanning step relative to the stop point.

20. The method recited in claim 18, wherein the detecting step includes the substep of determining whether the range and velocity of the peak headwind and/or peak tailwind determined at a target one of said plurality of angle report points substantially differs from the range and velocity of the angle report point immediately preceding said target report point.

21. A radar system for forming a data string record representing a plurality of microburst candidates in range and determining whether each of said plurality of microburst candidates is a valid candidate, comprising:

antenna scanning means for incrementally scanning the atmosphere in a plurality of angle slices;

means for identifying a plurality of headwinds or tailwinds or headwinds and tailwinds in one of said plurality of angle slices;

means for writing in said data string record a reference range and a reference velocity for each of said headwind and/or tailwind;

means for updating said data string record for each of said plurality of angle slices;

means for terminating said data string record; and means for determining whether any of said plurality of microburst candidates represented by said data string record is a valid candidate.

22. The radar system recited in claim 21, wherein the scanning means starts at an initial angle slice and the terminating means stops at a terminating angle slice, said system further comprising:

means for restarting the scanning means at an angle slice immediately following said initial angle slice if none of the plurality of microburst candidates is determined to be a valid candidate; and means for restarting the scanning means at a final angle slice, said final angle slice immediately following said terminating angle slice, if at least one of the plurality of microburst candidates is determined to be a valid candidate.

23. The radar system recited in claim 22, wherein the updating means is activated if the range and velocity of each of the plurality of headwinds and/or tailwinds determined at an incremented angle slice substantially match a corresponding one of the reference range and the reference velocity; and wherein the terminating angle slice represents the last angle slice of said plurality of angle slices at which the updating means is activated.

24. The radar system recited in claim 21, wherein the scanning means scans over a predetermined scanning range; and wherein the identifying means includes means for determining a plurality of local maximum headwinds and/or tailwinds within said predetermined scanning range.

25. The radar system recited in claim 24, wherein the means for determining a plurality of local maximum headwinds and/or tailwinds includes means for establishing a plurality of range domains, each of said plurality of range domains encompassing one of the plurality of headwinds and/or tailwinds and being defined by at least one of a plurality of range gates, each of said plurality of range gates being defined by an incremental distance along a radar line-of-sight from the scanning means.

26. The radar system recited in claim 25, wherein each of the plurality of headwinds and/or tailwinds has either a commencing headwind and a terminating tailwind if a divergent windshear is present, or a commencing tailwind and a terminating headwind if a convergent windshear is present; and wherein each of the plurality of range domains begins at a commencing range gate and ends at a terminating range gate, said terminating range gate indicating the location along the radar line-of-sight of said terminating headwind or tailwind.

27. The radar system recited in claim 26, wherein, for each succeeding range domain, the commencing range gate has an offset distance along the radar line-of-sight from the terminating range gate of the preceding range domain.

28. The radar system recited in claim 27, wherein the offset distance is dependent on the incremental distance defining the plurality of range gates and on a determination of the minimum possible range between two microburst candidates.

29. A method for forming a data string record representing a plurality of microburst candidates in range and determining whether each of said plurality of microburst candidates is a valid candidate, comprising:

incrementally scanning the atmosphere in a plurality of angle slices;

identifying a plurality of headwinds or tailwinds or headwinds and tailwinds in one of said plurality of angle slices;

writing in said data string record a reference range and a reference velocity for each of said headwind and/or tailwind;

updating said data string record for each of said plurality of angle slices;

terminating said data string record; and determining whether any of said plurality of microburst candidates represented by said data string record is a valid candidate.

30. The method recited in claim 29, wherein the scanning step starts at an initial angle slice and the terminating step stops at a terminating angle slice, the method further comprising:

reperforming the scanning step at an angle slice immediately following said initial angle slice if none of the plurality of microburst candidates is determined to be a valid candidate; and reperforming the scanning step at a final angle slice, said final angle slice immediately following said terminating angle slice, if at least one of the plurality of microburst candidates is determined to be a valid candidate.

31. The method recited in claim 30, wherein the updating step is performed if the range and velocity of each of the plurality of headwinds and/or tailwinds determined at an incremented angle slice substantially match a corresponding one of the reference range and the reference velocity; and wherein the terminating angle slice represents the last angle slice of said plurality of angle slices at which the updating step occurs.

32. The method recited in claim 29, wherein the scanning step scans over a predetermined scanning range; and wherein the identifying step includes the substep of determining a plurality of local maximum headwinds and tailwinds within said predetermined scanning range.

33. The method recited in claim 32, wherein the step of determining a plurality of local maximum headwinds and tailwinds includes the substep of establishing a plurality of range domains, each of said plurality of range domains encompassing one of the plurality of headwinds and/or tailwinds and being defined by at least one of a plurality of range gates, each of said plurality of range gates being defined by an incremental distance along a radar line-of-sight.

34. The method recited in claim 33, wherein each of the plurality of headwinds and/or tailwinds has either a commencing headwind and a terminating tailwind if a divergent windshear is present, or a commencing tailwind and a terminating headwind if a convergent windshear is present; and wherein each of the plurality of range domains begins at a commencing range gate and ends at a terminating range gate, said terminating range gate indicating the location along the radar line-of-sight of said terminating headwind or tailwind.

35. The method recited in claim 34, wherein, for each succeeding range domain, the commencing range gate has an offset distance along the radar line-of-sight from the terminating range gate of the preceding range domain.

36. The method recited in claim 35, wherein the offset distance is dependent on the incremental distance defining the plurality of range gates and on a determination of the minimum possible range between two microburst candidates.

37. The method recited in claim 32, wherein the step of determining a plurality of local maximum headwinds and tailwinds functions independently of the plurality of range domains determined in a preceding one of the plurality of angle slices.

38. A radar system for detecting small outflow radii microbursts, comprising:

means for incrementally scanning the atmosphere in an angular swath having a plurality of angle report points;

means for determining, at each of said plurality of angle report points, the radar radial gradient of wind velocity;

means for determining a horizontal hazard factor map of wind velocities;

means for estimating bias errors in the determined horizontal hazard factor map;

means for correcting bias errors in the determined horizontal hazard factor map; and means for identifying small radii microbursts based upon a horizontal hazard factor as provided in the corrected horizontal hazard factor map.

39. A method of detecting small outflow radii microbursts, comprising:

incrementally scanning the atmosphere in an angular swath having a plurality of angle report points;

determining, at each of said plurality of angle report points, the radar radial gradient of wind velocity;

determining a horizontal hazard factor map of wind velocities;

estimating bias errors in the determined horizontal hazard factor map;

correcting bias errors in the determined horizontal hazard factor map; and identifying small radii microbursts based upon a horizontal hazard factor as provided in the corrected horizontal hazard factor map.

* * * * *